United States Patent
Nakaseko

(10) Patent No.: US 9,538,103 B2
(45) Date of Patent: Jan. 3, 2017

(54) SIGNAL PROCESSING UNIT, SIGNAL PROCESSING METHOD, IMAGE PICKUP DEVICE, AND IMAGE PICKUP APPARATUS

(71) Applicant: Sony Corporation, Tokyo (JP)

(72) Inventor: Tetsuji Nakaseko, Fukuoka (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 14/185,644

(22) Filed: Feb. 20, 2014

(65) Prior Publication Data

US 2014/0240563 A1 Aug. 28, 2014

(30) Foreign Application Priority Data

Feb. 27, 2013 (JP) .................. 2013-036903

(51) Int. Cl.
*H04N 5/353* (2011.01)
*H04N 5/365* (2011.01)
*H04N 5/376* (2011.01)

(52) U.S. Cl.
CPC .............. *H04N 5/353* (2013.01); *H04N 5/365* (2013.01); *H04N 5/3765* (2013.01)

(58) Field of Classification Search
None
See application file for complete search history.

(56) References Cited

U.S. PATENT DOCUMENTS

| | | | | |
|---|---|---|---|---|
| 2008/0252765 A1* | 10/2008 | Ito | ................ | H04N 5/3532 348/308 |
| 2013/0093953 A1* | 4/2013 | Miyashita | ............ | H04N 5/3532 348/521 |
| 2014/0225998 A1* | 8/2014 | Dai | ................... | H01L 27/14601 348/65 |

* cited by examiner

*Primary Examiner* — Roberto Velez
*Assistant Examiner* — Yih-Sien Kao
(74) *Attorney, Agent, or Firm* — Chip Law Group

(57) ABSTRACT

A signal processing unit includes: a synchronizing signal control section configured to control length of a synchronizing signal for a predetermined row in a frame, in which the synchronizing signal serves as a basis of charge read processing that reads charge from a pixel array on a row basis; and a timing adjustment section configured to adjust timing of electronic shutter operation of unit pixels, according to the length of the synchronizing signal for the predetermined row controlled by the synchronizing signal control section.

20 Claims, 20 Drawing Sheets

SIGNAL PROCESSING UNIT, SIGNAL PROCESSING METHOD, IMAGE PICKUP DEVICE, AND IMAGE PICKUP APPARATUS

CROSS REFERENCE TO RELATED APPLICATIONS

This application claims the benefit of Japanese Priority Patent Application JP 2013-036903 filed Feb. 27, 2013, the entire contents of which are incorporated herein by reference.

BACKGROUND

The present technology relates to a signal processing unit, a signal processing method, an image pickup device, and an image pickup apparatus. In particular, the technology relates to a signal processing unit, a signal processing method, an image pickup device, and an image pickup apparatus capable of more accurately achieving a desired frame rate.

In a typical existing image sensor, charge accumulated in a light receiving section (photodiode) is read as a signal voltage, and is subjected to analog-to-digital (A/D) conversion. The charge read from the light receiving section of each of unit pixels arranged in arrays is subjected to A/D conversion by an A/D converter (also referred to as analog digital converter (ADC)) prepared for each column. Each A/D converter sequentially processes charge read from a unit pixel on each of rows along a column corresponding thereto. That is, charge read from each unit pixel of the pixel array is processed on a row basis.

In other words, charge read operation from each unit pixel is performed every row of the pixel array. Timing of processing on such read of each row is controlled based on a horizontal synchronizing signal. Specifically, length of a horizontal synchronizing signal corresponding to the total number of rows of the pixel array and rows in a blanking period corresponds to processing time for one frame. In other words, a frame rate is allowed to be controlled through control of the length of the horizontal synchronizing signal.

For example, the horizontal synchronizing signal may be generated based on an internal clock generated by multiplication and/or dividing of an externally supplied clock (for example, see Japanese Patent No. 4655500).

SUMMARY

In the existing method, however, length of the horizontal synchronizing signal for each row is difficult to be accurately set in correspondence to a desired frame rate. Hence, in the case where a horizontal synchronizing interval is constant, a desired frame rate is difficult to be achieved. In the case where a horizontal synchronizing interval is partially varied to accurately achieve a desired frame rate, image quality may be degraded.

It is desirable to more accurately achieve a desired frame rate.

According to an embodiment of the present technology, there is provided a signal processing unit including: a synchronizing signal control section configured to control length of a synchronizing signal for a predetermined row in a frame, the synchronizing signal being a basis of charge read processing that reads charge from a pixel array on a row basis; and a timing adjustment section configured to adjust timing of electronic shutter operation of unit pixels, according to the length of the synchronizing signal for the predetermined row controlled by the synchronizing signal control section.

The timing adjustment section may adjust the timing to allow exposure time of each row to be constant.

The synchronizing signal control section may control the length of the synchronizing signal for the predetermined row within a range that is shorter than length of the synchronizing signal for one row, to allow length of the synchronizing signal for one frame to correspond to a desired frame rate.

The synchronizing signal control section may set the predetermined row to be within a blanking period.

The signal processing unit may further include an exposure time determination section configured to determine exposure time of each row on which the control by the synchronizing signal control section is reflected, and the timing adjustment section may adjust the timing according to the exposure time determined by the exposure time determination section.

The signal processing unit may further include a synchronizing signal generation section configured to generate the synchronizing signal on which the control by the synchronizing signal control section is reflected, and the timing adjustment section may adjust the timing, according to the length of the synchronizing signal generated by the synchronizing signal generation section for the predetermined row.

The signal processing unit may further include: a shutter control section configured to control the electronic shutter operation to be performed at timing adjusted by the timing adjustment section, based on the synchronizing signal on which the control by the synchronizing signal control section is reflected; and a read control section configured to control the charge read operation of the unit pixels, based on the synchronizing signal on which the control by the synchronizing signal control section is reflected.

According to an embodiment of the present technology, there is provided a signal processing method including: controlling length of a synchronizing signal for a predetermined row in a frame, the synchronizing signal being a basis of charge read processing that reads charge from a pixel array on a row basis; and adjusting timing of electronic shutter operation of unit pixels, according to the length of the synchronizing signal for the predetermined row.

According to an embodiment of the present technology, there is provided an image pickup device including: a pixel array including unit pixels that are arranged side by side, each of the unit pixels including a photoelectric conversion element configured to perform photoelectric conversion on incident light; a synchronizing signal control section configured to control length of a synchronizing signal for a predetermined row in a frame, the synchronizing signal being a basis of charge read processing that reads charge from the pixel array on a row basis; and a timing adjustment section configured to adjust timing of electronic shutter operation of the unit pixels, according to the length of the synchronizing signal for the predetermined row controlled by the synchronizing signal control section.

According to an embodiment of the present technology, there is provided an image pickup apparatus provided with an image pickup section and an image processing section. The image pickup section is configured to capture an image of an object, and the image processing section is configured to perform image processing on image data obtained through the image capture by the image pickup section. The image pickup section includes: a pixel array including unit pixels that are arranged side by side, in which each of the unit pixels includes a photoelectric conversion element configured to perform photoelectric conversion on incident light; a synchronizing signal control section configured to control length of a synchronizing signal for a predetermined row in a frame, in which the synchronizing signal is a basis of charge read processing that reads charge from the pixel array on a row basis; and a timing adjustment section configured to adjust timing of electronic shutter operation of the unit pixels, according to the length of the synchronizing signal for the predetermined row controlled by the synchronizing signal control section.

According to an embodiment of the present technology, there is provided a signal processing unit including: a measuring section configured to measure length of a horizontal synchronizing signal using an internal clock, and to generate a parameter that determines, based on the internal clock, processing time for one row, the horizontal synchronizing signal being a basis of charge read processing that reads charge from a pixel array on a row basis and being based on an external clock, and the internal clock being asynchronous to the external clock; and a horizontal-synchronizing-signal generation section configured to generate the horizontal synchronizing signal that is based on the internal clock, using the parameter determined by the measuring section.

The measuring section may measure the length of the horizontal synchronizing signal that is based on the external clock and for a predetermined row in a blanking period.

The measuring section may generate the parameter through measuring the length of the horizontal synchronizing signal that is based on the external clock and for one row in the blanking period.

The measuring section may measure the length of the horizontal synchronizing signal that is based on the external clock and for each of a plurality of rows in the blanking period, and generates the parameter from a result of the measurement for each of the rows.

The signal processing unit may further include an external-clock-based horizontal-synchronizing-signal generation section configured to generate the horizontal synchronizing signal that is based on the external clock, and the measuring section may measure the length of the horizontal synchronizing signal that is based on the external clock and generated by the external-clock-based horizontal-synchronizing-signal generation section.

The signal processing unit may further include an internal-clock generation section configured to generate the internal clock using the external clock, and the measuring section may measure the length of the horizontal synchronizing signal that is based on the external clock, using the internal clock generated by the internal-clock generation section, and the horizontal-synchronizing-signal generation section may generate the horizontal synchronizing signal that is based on the internal clock, using the parameter determined by the measuring section and the internal clock generated by the internal-clock generation section.

The internal-clock generation section may generate the internal clock using another external clock that is independent of the external clock that serves as a basis of the horizontal synchronizing signal to be measured by the measuring section.

According to an embodiment of the present technology, there is provided a signal processing method including: measuring length of a horizontal synchronizing signal using an internal clock, thereby generating a parameter that determines, based on the internal clock, processing time for one row, the horizontal synchronizing signal being a basis of charge read processing that reads charge from a pixel array on a row basis and being based on an external clock, and the internal clock being asynchronous to the external clock; and generating, using the determined parameter, the horizontal synchronizing signal that is based on the internal clock.

According to an embodiment of the present technology, there is provided an image pickup device including: a pixel array including unit pixels that are arranged side by side, each of the unit pixels including a photoelectric conversion element configured to perform photoelectric conversion on incident light; a measuring section configured to measure length of a horizontal synchronizing signal using an internal clock, and to generate a parameter that determines, based on the internal clock, processing time for one row, the horizontal synchronizing signal being a basis of charge read processing that reads charge from the pixel array on a row basis and being based on an external clock, and the internal clock being asynchronous to the external clock; and a horizontal-synchronizing-signal generation section configured to generate the horizontal synchronizing signal that is based on the internal clock, using the parameter determined by the measuring section.

According to an embodiment of the present technology, there is provided an image pickup apparatus provided with an image pickup section and an image processing section. The image pickup section is configured to capture an image of an object, and the image processing section is configured to perform image processing on image data obtained through the image capture by the image pickup section. The image pickup section includes: a pixel array including unit pixels that are arranged side by side, in which each of the unit pixels includes a photoelectric conversion element configured to perform photoelectric conversion on incident light; a measuring section configured to measure length of a horizontal synchronizing signal using an internal clock, and to generate a parameter that determines, based on the internal clock, processing time for one row, in which the horizontal synchronizing signal is a basis of charge read processing that reads charge from the pixel array on a row basis and is based on an external clock, and the internal clock is asynchronous to the external clock; and a horizontal-synchronizing-signal generation section configured to generate the horizontal synchronizing signal that is based on the internal clock, using the parameter determined by the measuring section.

In one of the above-described embodiments of the technology, the length of the synchronizing signal, serving as a basis of the charge read processing that reads charge from the pixel array on a row basis, for a predetermined row in a frame is controlled, and the timing of the electronic shutter operation of unit pixels is controlled according to the length of the synchronizing signal for the predetermined row.

In another one of the above-described embodiments of the technology, the length of the horizontal synchronizing signal, serving as a basis of the charge read processing that reads charge from the pixel array on a row basis and based on the external clock, is measured using the internal clock that is asynchronous to the external clock, and thereby the parameter that determines processing time for one row on the basis of the internal clock is generated. Further, the horizontal synchronizing signal on the basis of the internal clock is generated using the determined parameter.

According to any of the above-described embodiments of the technology, a signal is processed. In particular, a desired frame rate is more accurately achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure are described. It is to be noted that description is made in the following order.

1. First embodiment (CMOS image sensor).
2. Second embodiment (CMOS image sensor).
3. Third embodiment (Image pickup apparatus).
4. Fourth embodiment (Computer).

1. First Embodiment

Processing Time for One Frame

A typical existing image sensor includes unit pixels arranged in arrays, each unit pixel including a light receiving section (photodiode). Charge accumulated in each unit pixel (light receiving section) is read as a signal voltage for each row of the pixel array in response to a horizontal synchronizing signal, and is subjected to A/D conversion by an A/D converter (also referred to as analog digital converter (ADC)) prepared for each column of the pixel array.

Figure 1:
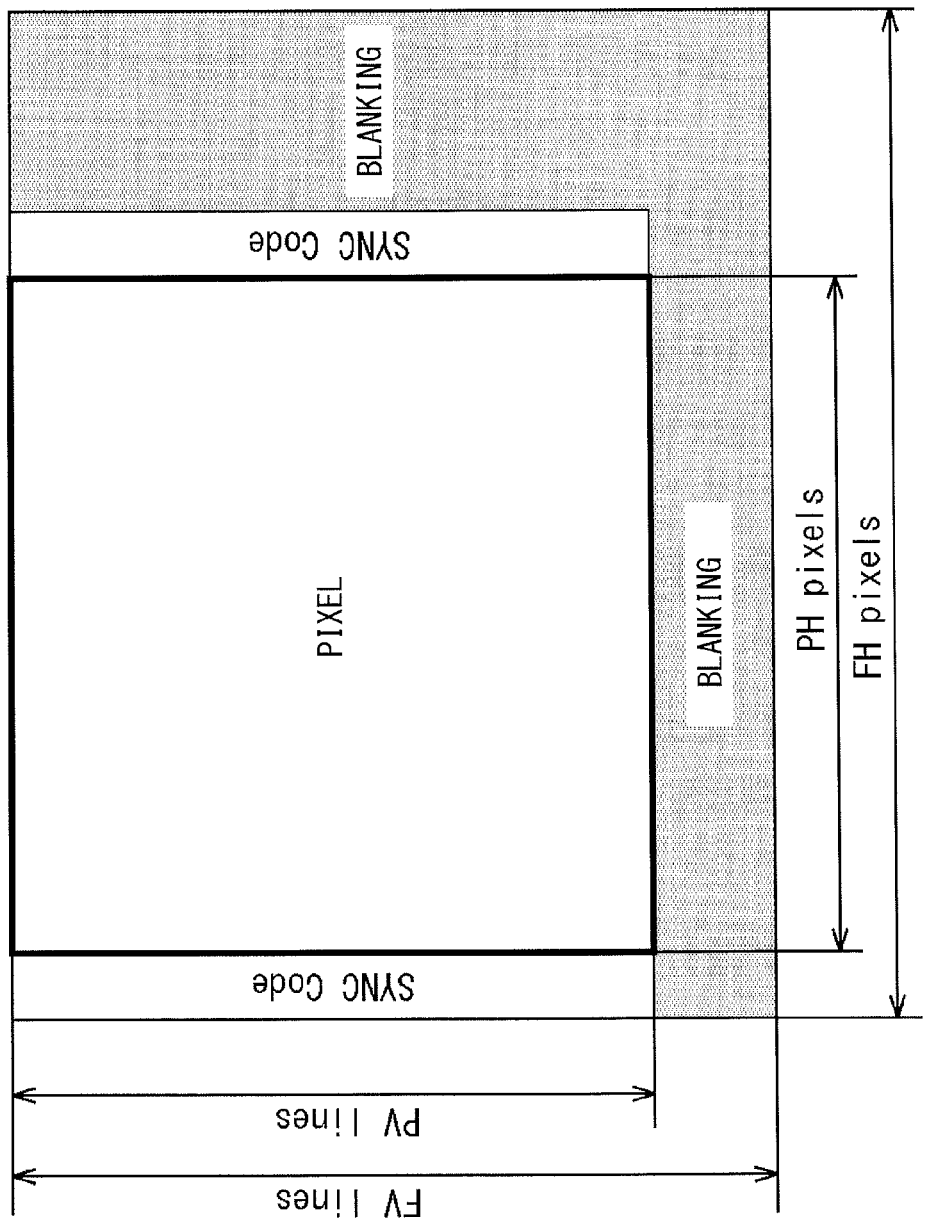
FIG. 1 is a diagram illustrating an example of signal processing for one frame.

FIG. 1 is a diagram illustrating an example of signal processing for one frame. In the exemplary case of FIG. 1, an imager outputs pixel data every row while adding special data such as SYNC Code, etc. A period having no data referred to as blanking (also referred to as blanking period) exists after every output of one row. Furthermore, the blanking period is also provided after output of pixel data of all rows. In other words, the sum of processing time of the pixel data and the special data and such blanking periods corresponds to processing time for one frame.

For example, as in the exemplary case of FIG. 1, in the case of an imager that outputs the number of data corresponding to rows (PV lines) by pixels (PH pixels), time for output of the number of data corresponding to rows (FV lines) by pixels (FH pixels) after addition of the SYNC Code and the blanking corresponds to time for output of one frame. Specifically, processing time (tF) for one frame is represented as the following Expression (1) using processing time (tH) for one row and the number of rows (FV lines) (including blanking).

[Numerical Expression 1]

$$(tF)=(tH)\times(FV\ \text{lines}) \qquad (1)$$

The processing time (tH) for one row is represented as the following Expression (2) using length of a reference clock (also referred to as reference clock period) (PCKtime) for processing of data of one pixel, and the number of processing clocks (FH pixels) for one row (including blanking).

[Numerical Expression 2]

$$(tH)=(PCK\text{time})\times(FH\ \text{pixels}) \qquad (2)$$

Hence, the processing time (tF) for one frame is also represented as the following Expression (3).

[Numerical Expression 3]

$$(tF)=(FM\ \text{pixels})\times(FV\ \text{lines})\times(PCK\text{time}) \qquad (3)$$

[Fine Adjustment of Processing Time for One Frame]

As described above, charge read processing is performed in rows. In other words, electronic shutter processing and charge read processing on each unit pixel are each performed every row of the pixel array. Time from end of the electronic shutter processing to start of the charge read processing corresponds to exposure time of each row. If the exposure time of each row is not constant, image degradation such as difference in level may be caused in an output image.

Thus, to suppress such degradation in image quality of an output image, processing time for each row is necessary to be substantially constant to allow exposure time of each row to be constant. However, processing time for one frame corresponding to a desired frame rate is not necessarily equal to an integral multiple of the processing time (tH) for one row. Such difference in processing time is accumulated with increase in number of frames to be processed; hence, such accumulated time difference is eventually negligible, leading to a possibility of degradation in image quality of an output image. Hence, a frame rate of an output image output from an image sensor is necessary to be readjusted to suppress such difference, leading to a possibility of increase in processing time and cost.

Figure 2:
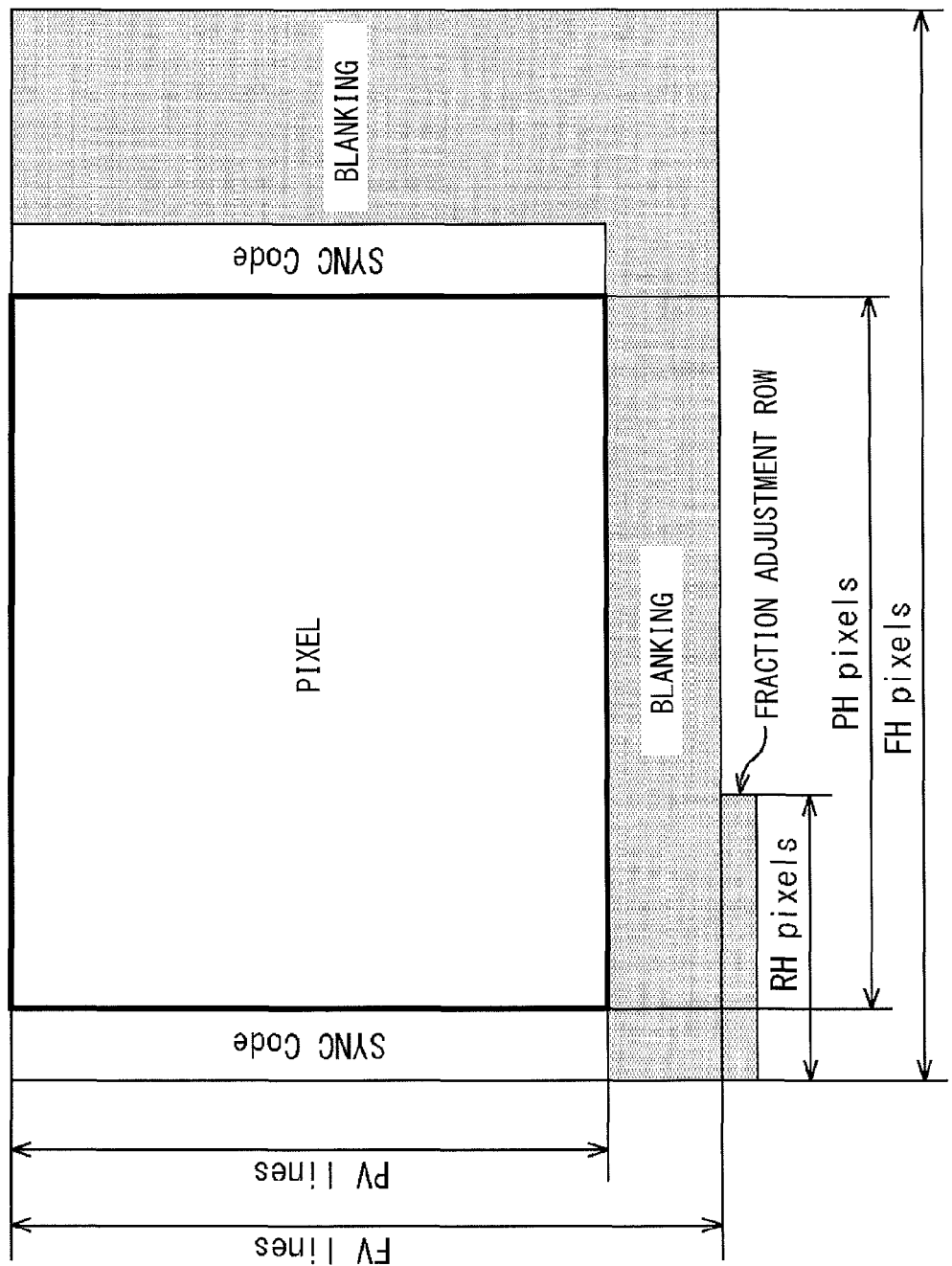
FIG. 2 is a diagram illustrating an example of fine adjustment of a frame rate.

FIG. 2 is a diagram illustrating an example of fine adjustment of a frame rate. For example, as illustrated in FIG. 2, a fraction adjustment row (corresponding to (RH pixels)) shorter than another row is added to a predetermined row in the example of FIG. 1. Thereby, processing time for one frame (i.e., frame rate) is allowed to be finely adjusted (adjusted for a period shorter than the processing time (tH) for one row). In other words, in this case, the processing time (tF) for one frame is represented as the following Expression (4).

[Numerical Expression 4]

$$(tF)=\{(FV \text{ lines})\times(FH \text{ pixels})+(RH \text{ pixels})\}\times(PCK\text{-time}) \quad (4)$$

In other words, in this case, length of a horizontal synchronizing signal for a predetermined row is controlled to be within a range shorter than length of a horizontal synchronizing signal for one row such that length of a horizontal synchronizing signal for one frame corresponds to a desired frame rate.

[Addition of Fraction Adjustment Row and Exposure Time]

Figure 3:
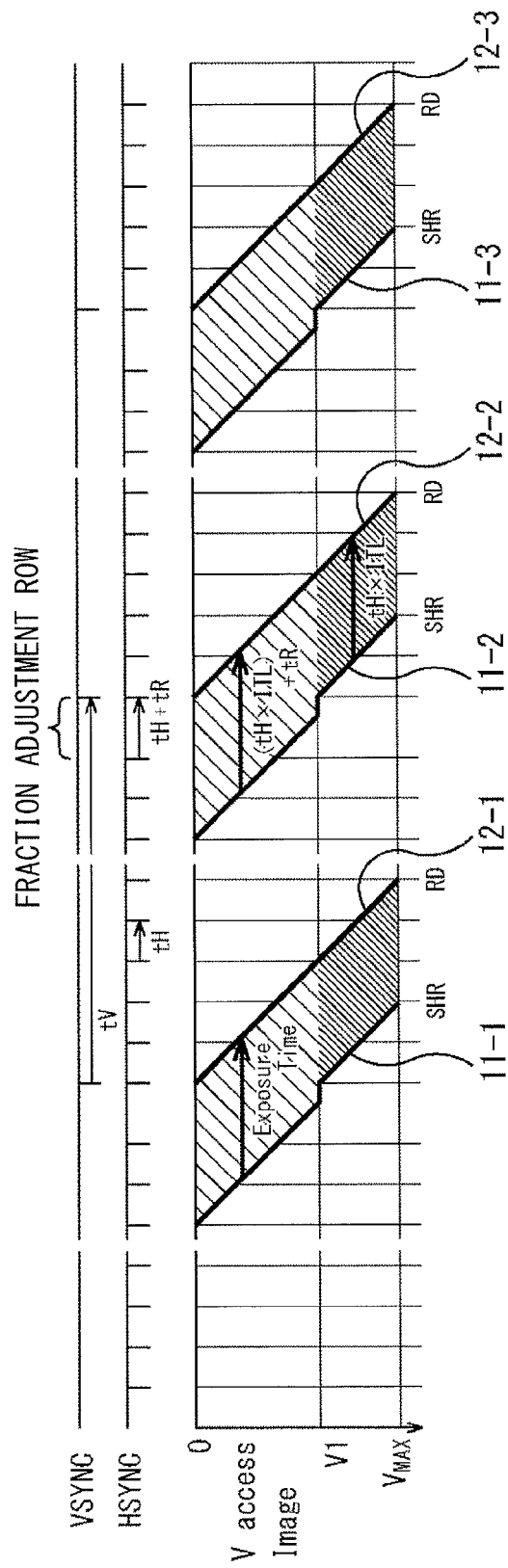
FIG. 3 is a diagram illustrating an example of influence of fine adjustment of a frame rate on exposure time.

In this case, however, a row, for which processing time is different from others, is formed, and consequently processing time (tH) for one row is uneven in a frame. FIG. 3 is a diagram illustrating an example of influence of fine adjustment of a frame rate on exposure time in such a case. As a horizontal synchronizing signal (HSYNC) illustrated in FIG. 3, processing time for a row having a fraction adjustment row added thereto is relatively long in correspondence to processing time (tR) for the fraction adjustment row, i.e., (tH+tR), while processing time for another row is (tH). As a result, when electronic shutter processing and charge read processing for each row are performed on the basis of the horizontal synchronizing signal (HSYNC), length of exposure time of each row varies between a row that contains a horizontal synchronizing period of the added fraction adjustment row and a row that does not contain such a horizontal synchronizing period.

In the exemplary case of FIG. 3, exposure time of each of a 0th row to a V1th row contains the horizontal synchronizing period of the added fraction adjustment row, while exposure time of each of a (V1+1)th row to a Vmaxth row does not contain the horizontal synchronizing period of the added fraction adjustment row.

As a result, as illustrated in FIG. 3, timing (SHR) of electronic shutter processing is represented as a curved line as shown by curved lines 11-1 to 11-3 while being represented as a straight line before fraction adjustment as shown by straight lines 12-1 to 12-3. Consequently, time (exposure time) from timing (SHR) of electronic shutter processing to timing (RD) of read processing is not even over all rows.

Specifically, using the processing time (tH) for one row, the processing time (tR) for a fraction adjustment row (also referred to as fraction adjustment time), and exposure time setting (ITL), exposure time of each of the 0th row to the V1th row, ExposureTime1, is represented as the following Expression (5), and exposure time of each of the (V1+1)th row to the Vmaxth row, ExposureTime2, is represented as the following Expression (6).

[Numerical Expression 5]

$$\text{ExposureTime1}=(tH\times ITL)+tH \quad (5)$$

$$\text{ExposureTime2}=(tH\times ITL) \quad (6)$$

In other words, such fraction adjustment may cause a plurality of pieces of exposure time in a frame (uneven exposure time in a frame). Therefore, image degradation such as difference in level may occur in an output image as described above. Hence, image processing is necessary to be performed on an output image output from the image sensor to suppress such degradation in image quality (such as to suppress difference in level in an output image), which may increase processing time and cost.

[Adjustment of Electronic Shutter Timing]

Therefore, electronic shutter timing is adjusted to suppress a variation in exposure time caused by fraction adjustment so that exposure time of each row is even (constant) in a frame.

For example, in the exemplary case of FIG. 3, the fraction adjustment row exists in the exposure time of each of the 0th row to the V1th row, and therefore exposure time is lengthened in correspondence to fraction adjustment time (tR). Hence, for each of such rows, electronic shutter timing is delayed by the fraction adjustment time (tR) from an initial value.

On the other hand, the fraction adjustment row does not exist in the exposure time of each of the (V1+1)th row to the Vmaxth row. The exposure time is therefore not lengthened. Hence, for each of such rows, electronic shutter timing is maintained to the initial value.

This is described further in detail. It is assumed that while exposure time of each row is even in a frame while no fraction adjustment is performed, but the exposure time of each row becomes uneven in a frame due to addition of the fraction adjustment row, as in the exemplary case of FIG. 3. In this case, the electronic shutter timing (SHR) is assumed to correspond to time Ssta from the horizontal synchronizing signal (HSYNC), and an initial value of the time Ssta is assumed to be "0". With a row having the fraction adjustment row in the exposure time thereof, the time Ssta is represented as the following Expression (7). With a row having no fraction adjustment row in the exposure time thereof, the time Ssta is represented as the following Expression (8).

[Numerical Expression 6]

$$Ssta=0+tR \quad (7)$$

$$Ssta=0 \quad (8)$$

The electronic shutter timing is adjusted in this way, thereby exposure time is allowed to be equalized in a frame. Specifically, the frame rate is allowed to be finely adjusted while degradation in image quality of an output image is suppressed. Such degradation in image quality of an output image due to fine adjustment of a frame rate is not preferable, and is often unallowable. Hence, fine adjustment of a frame rate is practically achieved by use of an example embodiment of the technology as described above (by adjustment of the electronic shutter timing as described above). In other words, a desired frame rate is more accurately achieved through use of an example embodiment of the technology as described above.

For example, the image data and the SYNC Code in FIG. 2 may be subjected to A/D conversion. The A/D conversion processing is also performed on the basis of the horizontal synchronizing signal. Specifically, fraction adjustment on a row containing the image data and the SYNC Code varies length of the horizontal synchronizing signal for the row, and therefore a result of A/D conversion processing on the row may also be affected thereby. The fraction adjustment is therefore desirably performed on a row to be not subjected to A/D conversion (for example, a row in the blanking period in FIG. 2). Specifically, fraction adjustment may be performed on a row to be not subjected to A/D conversion (or a row available for fraction adjustment may be limited to a row to be not subjected to A/D conversion). In other words, performing fraction adjustment on the row to be subjected to A/D conversion may be prohibited.

Moreover, description has been made on a case where the fraction adjustment time (tR) is added, as the fraction adjustment, to processing time for a predetermined row hereinbefore, this is not limitative. The fraction adjustment time (tR) may be subtracted from processing time for a predetermined row. In such a case, as in the above-described case of adding the fraction adjustment time, the electronic shutter timing may be adjusted such that variation in exposure time caused by subtraction of the fraction adjustment time is suppressed to equalize exposure time in a frame. Specifically, in this case, electronic shutter timing may be advanced by the fraction adjustment time that may affect exposure time. In other words, a value of the fraction adjustment time (tR) in the above-described Expression (7) may be a negative value.

Furthermore, fraction adjustment may be dividedly performed over a plurality of rows in a frame. For example, in the case where fraction adjustment is performed on predetermined N rows in a frame, a fraction adjustment time of tR/N for one row may be adjusted. In addition, fraction adjustment time for each row may not be constant. Furthermore, rows, on which fraction adjustment is to be performed, may not be in succession.

In the case where fraction adjustment is performed on predetermined one row in a frame, two types of length of exposure time are given as represented by the above-described Expressions (5) and (6). On the other hand, in the case where fraction adjustment is dividedly performed over a plurality of rows, types of length of exposure time may be increased to three or more types. In such a case, as in the case of the above-described Expressions (7) and (8), electronic shutter timing may be adjusted for each row in correspondence to fraction adjustment time that affects exposure time.

[CMOS Image Sensor]

Figure 4:
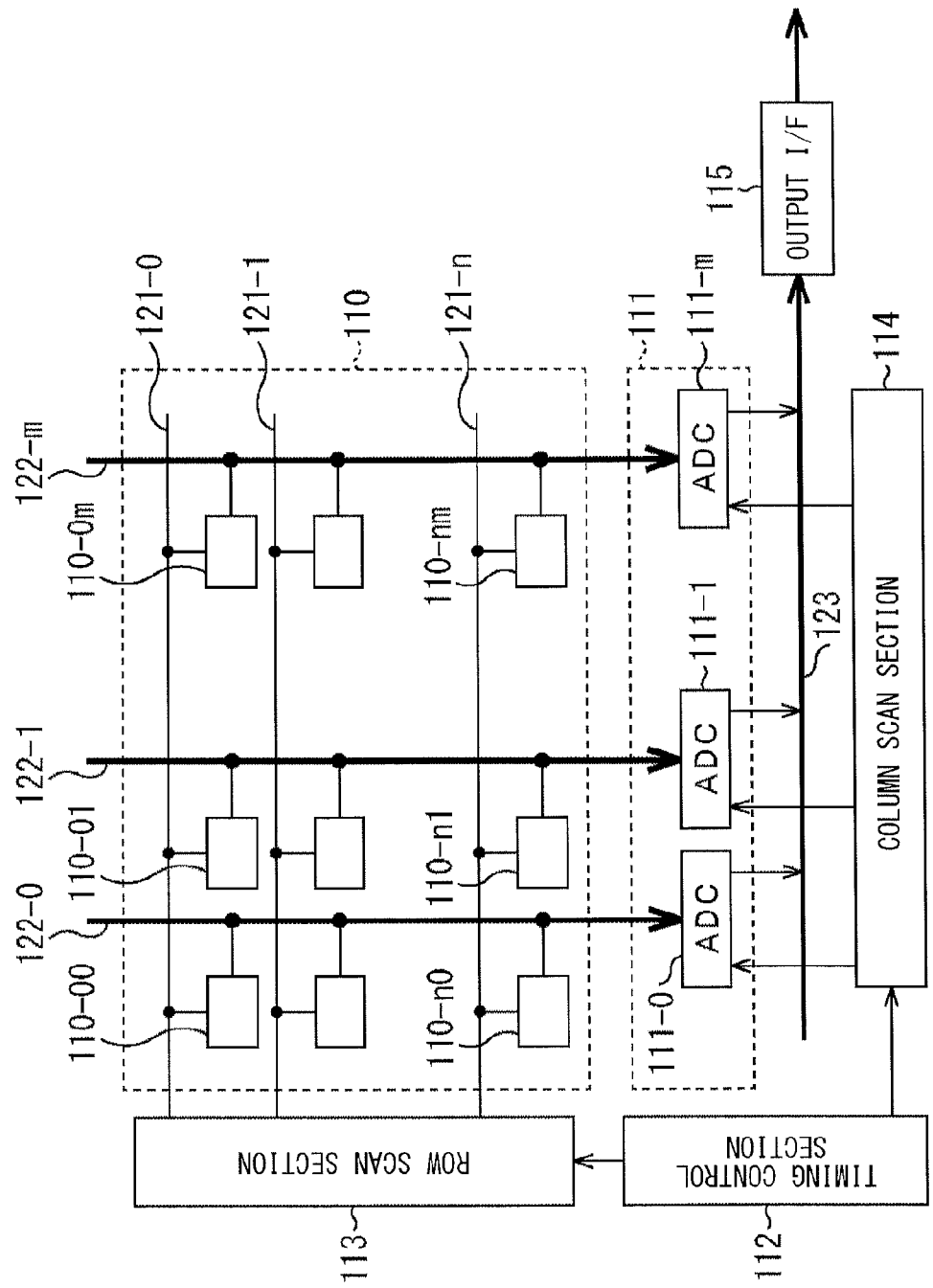
FIG. 4 is a diagram illustrating an exemplary main configuration of a CMOS image sensor.

FIG. 4 is a diagram illustrating an exemplary main configuration of a complementary metal oxide semiconductor (CMOS) image sensor. A CMOS image sensor 100 illustrated in FIG. 4 is an example of an image pickup device using CMOS, or a signal processing unit configured to process an image signal obtained in a pixel region. As illustrated in FIG. 4, the CMOS image sensor 100 performs photoelectric conversion on light entering a pixel array 110, performs A/D conversion on the resultant analog signal by an A/D conversion section 111, and outputs the resultant digital data corresponding to an image that corresponds to the entering light.

In the pixel array 110, unit pixels 110-00 to 110-nm illustrated by squares in the drawing, each unit pixel including a photoelectric conversion element, are arranged in an n-row-m-column array pattern (matrix pattern). In FIG. 4, the unit pixels are partially shown. The number of the pixel array 110 is an arbitrary number. The number of rows and of columns is also an arbitrary number.

The A/D conversion section 111 is configured of ADC 111-0 to ADC 111-m (also referred to as column ADC) provided for individual columns of the pixel array 110. Each of the ADC 111-0 to ADC 111-m performs A/D conversion on an analog pixel signal read from each of unit pixels on a column corresponding thereto.

The CMOS image sensor 100 further includes a timing control section 112 as an example of the signal processing unit, a row scan section 113, a column scan section 114, and an output interface (output I/F) 115.

The timing control section 112 is configured to control timing of operation of each unit pixel of the pixel array 110, and timing of various types of processing such as processing on read of a pixel signal from each unit pixel, A/D conversion processing of the read pixel signal, and transfer processing of the read pixel signal.

For example, the timing control section 112 may control length of a horizontal synchronizing signal for a predetermined row in a frame, the horizontal synchronizing signal serving as a basis of charge read processing that reads charge from the pixel array 110 on a row basis, and adjusts timing of electronic shutter operation of a unit pixel according to the length of the synchronizing signal for the predetermined row.

For example, the timing control section 112 may perform control of such various types of processing through control of the row scan section 113 and the column scan section 114.

The row scan section 113 is connected to the individual unit pixels of the pixel array 110 through horizontal signal lines 121-0 to 121-n. Hereinafter, in the case where the horizontal signal lines 121-0 to 121-n are not necessary to be described in distinction from one another, the horizontal signal lines 121-0 to 121-n may be simply referred to as horizontal signal lines 121. The row scan section 113 controls operation such as electronic shutter processing and charge read processing of each unit pixel of the pixel array 110 through the horizontal signal lines 121 in accordance with timing controlled by the timing control section 112.

The column scan section 114 controls operation of each column ADC of the A/D conversion section 111 in accordance with timing controlled by the timing control section 112 to allow the column ADC to sequentially perform A/D conversion on pixel signals for each row. Each of ADC 111-0 to ADC 111-m is connected to unit pixels on a column corresponding thereto of the pixel array 110 through each of vertical signal lines 122-0 to 122-m, and receives respective pixel signals read from the unit pixels through each of the vertical signal lines 122-0 to 122-m. Hereinafter, in the case where the vertical signal lines 122-0 to 122-m are not necessary to be described in distinction from one another, the horizontal signal lines 121-0 to 121-n may be simply referred to as vertical signal lines 122.

The output interface (output I/F) 115 outputs digital data of the pixel signal (a pixel signal subjected to A/D conversion) supplied from each column ADC of the A/D conversion section 111 to outside of the CMOS image sensor 100 (for example, another unit (for example, image processing unit, etc.) connected to the CMOS image sensor 100).

[Unit Pixel]

Figure 5:
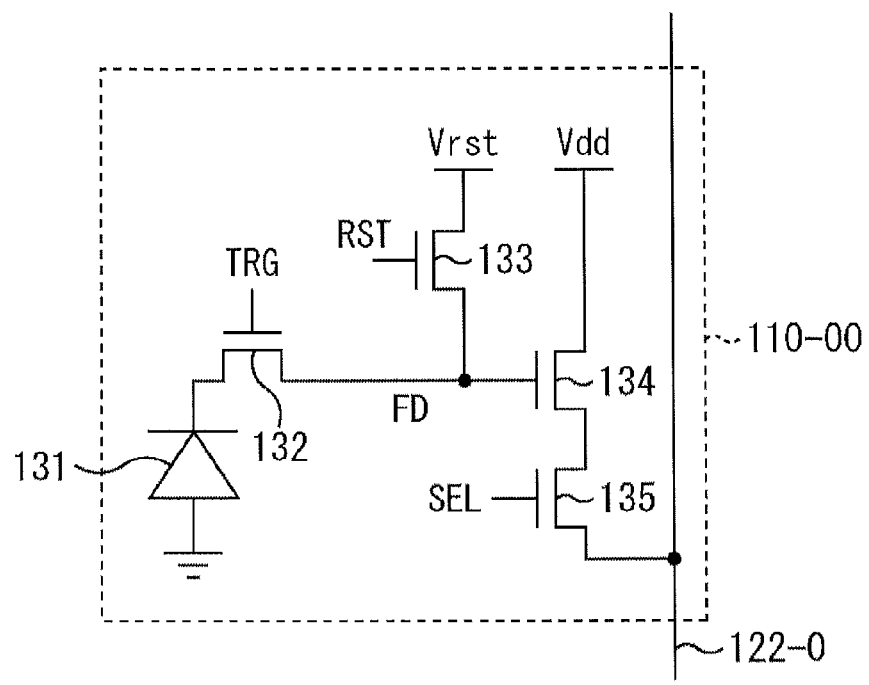
FIG. 5 is a diagram illustrating an exemplary main configuration of a unit pixel.

A unit pixel 110-00 in FIG. 4 is now described. FIG. 5 is a diagram illustrating an exemplary main configuration of the unit pixel 110-00. As illustrated in FIG. 5, the unit pixel 110-00 includes a photodiode 131, a transfer transistor 132, a reset transistor 133, an amplifying transistor 134, and a selection transistor 135. The unit pixel 110-00 is connected to the vertical signal line 122-0.

Photocharge generated in the photodiode 131 as an example of a photoelectric conversion element is transferred to parasitic capacitance of a node FD by a control signal TRG of a gate of the transfer transistor 132, and is subjected to charge-to-voltage conversion. This voltage is connected to a gate of the amplifying transistor 134, and is output as a pixel signal to the vertical signal line 122-0 when a pixel is selected by a control signal SEL of a gate of the selection transistor 135. The node FD may be set to a predetermined voltage Vrst by a control signal RST for a gate of the reset transistor 133, and the voltage Vrst may be outputted in a form of a pixel signal indicating a fluctuation component of the amplifying transistor 134, etc.

Each control signal is supplied from the row scan section 113 through the horizontal signal line 121. Specifically, electronic shutter processing and read processing of each unit pixel are controlled through ON/OFF of such control signals.

Although a configuration of the unit pixel 110-00 has been described with FIG. 5, any of other unit pixels has a configuration similar to the configuration of the unit pixel 110-00.

[Timing Control Section]

Figure 6:
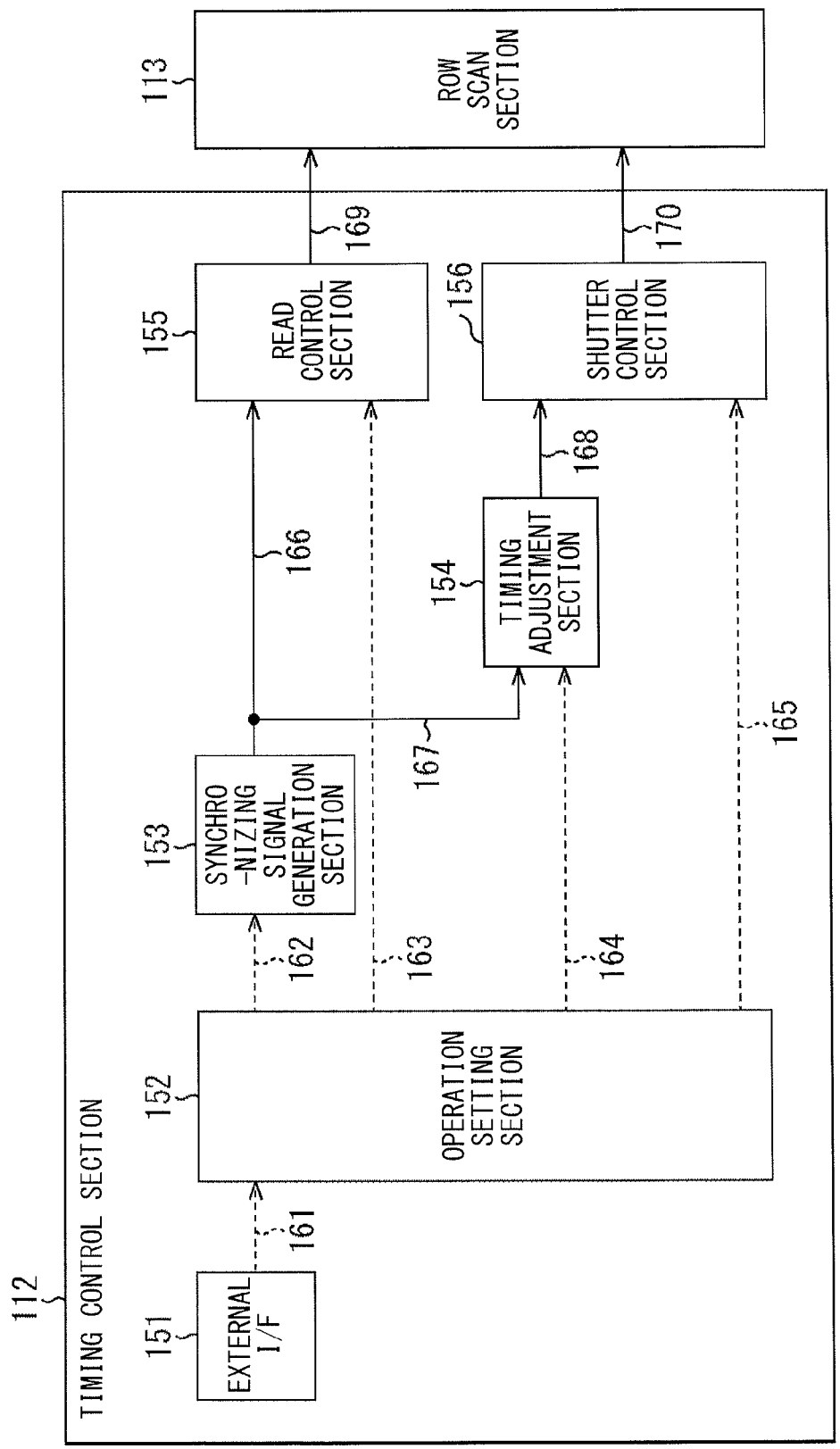
FIG. 6 is a diagram illustrating an exemplary main configuration of a timing control section.

FIG. 6 is a block diagram illustrating an exemplary main configuration of the timing control section 112 in FIG. 4. As illustrated in FIG. 6, the timing control section 112 includes an external interface (I/F) 151, an operation setting section 152, a synchronizing signal generation section 153, a timing adjustment section 154, a read control section 155, and a shutter control section 156.

The external interface 151 is configured to receive setting information (or a setting command) supplied from outside of the CMOS image sensor 100, for example, a master of a camera system, etc., and to supply the setting information to the operation setting section 152 (arrow 161).

The operation setting section 152 is configured to decode the setting information supplied from the external interface 151, and to control length of a horizontal synchronizing signal for a predetermined row in a frame based on the decoded information. Specifically, based on the supplied setting information, the operation setting section 152 supplies control information instructing generation of a synchronizing signal and fraction adjustment to the synchronizing signal generation section 153 (arrow 162).

The adjustment amount of the fraction adjustment and a row to be subjected to the fraction adjustment may be determined by the operation setting section 152, or may be contained in externally supplied setting information.

In the case where the operation setting section 152 determines such parameters, the operation setting section 152 obtains length of a horizontal synchronizing signal for one frame from information on a cycle of a horizontal synchronizing signal specified in the externally supplied setting information, and obtains a difference between the length and processing time for one frame corresponding to a desired frame rate specified in the setting. The operation setting section 152 finely adjusts a frame rate obtained from the length of the horizontal synchronizing signal such that the difference is reduced. Specifically, the operation setting section 152 controls length of a horizontal synchronizing signal for a predetermined row to be within a range shorter than length of a horizontal synchronizing signal for one row, and performs fraction adjustment. For example, the operation setting section 152 may specify a predetermined row within a blanking period as a row to be subjected to the fraction adjustment.

Moreover, the operation setting section 152 supplies control information, which instructs the read control section 155 to control read processing on the basis of the horizontal synchronizing signal subjected to the fraction adjustment, to the read control section 155 (arrow 163).

Furthermore, the operation setting section 152 supplies control information, which instructs the timing adjustment section 154 to adjust electronic shutter timing, to the timing adjustment section 154 (arrow 164). For example, for which row and to what degree the electronic shutter timing is adjusted may be specified by externally supplied setting information.

Furthermore, the operation setting section 152 supplies control information, which instructs the shutter control section 156 to control electronic shutter processing, to the shutter control section 156 (arrow 165).

The synchronizing signal generation section 153 generates synchronizing signals (a horizontal synchronizing signal and a vertical synchronizing signal) subjected to the fraction adjustment in accordance with the control information supplied from the operation setting section 152. The synchronizing signal generation section 153 supplies the generated synchronizing signals to the read control section 155 and the timing adjustment section 154 (arrows 166 and 167).

The timing adjustment section 154 adjusts the electronic shutter timing that is based on the synchronizing signal subjected to the fraction adjustment supplied from the synchronizing signal generation section 153 as described in [Adjustment of Electronic Shutter Timing], in accordance with the control information supplied from the operation setting section 152. Specifically, the timing adjustment section 154 adjusts the electronic shutter timing such that variation in exposure time caused by fraction adjustment is suppressed so that exposure time of each row in a frame becomes even (constant). For example, in the exemplary case of FIG. 3, the electronic shutter timing may be adjusted as represented by the Expression (7) or (8).

The timing adjustment section 154 supplies, to the shutter control section 156, information on the electronic shutter timing adjusted in correspondence to the amount of fraction adjustment and the synchronizing signal subjected to the fraction adjustment (arrow 168).

Based on the control command supplied from the operation setting section 152, the read control section 155 controls the row scan section 113 to execute the charge read processing from the unit pixels of the pixel array 110 at timing that is based on the synchronizing signal supplied from the synchronizing signal generation section 153 (arrow 169).

Based on the control command supplied from the operation setting section 152, the shutter control section 156 controls the row scan section 113 to execute the electronic shutter processing of each unit pixel of the pixel array 110, at timing specified by the information supplied from the synchronizing signal generation section 153 and based on the synchronizing signal supplied from the synchronizing signal generation section 153 (arrow 170).

[Flow of Timing Control Process]

Figure 7:
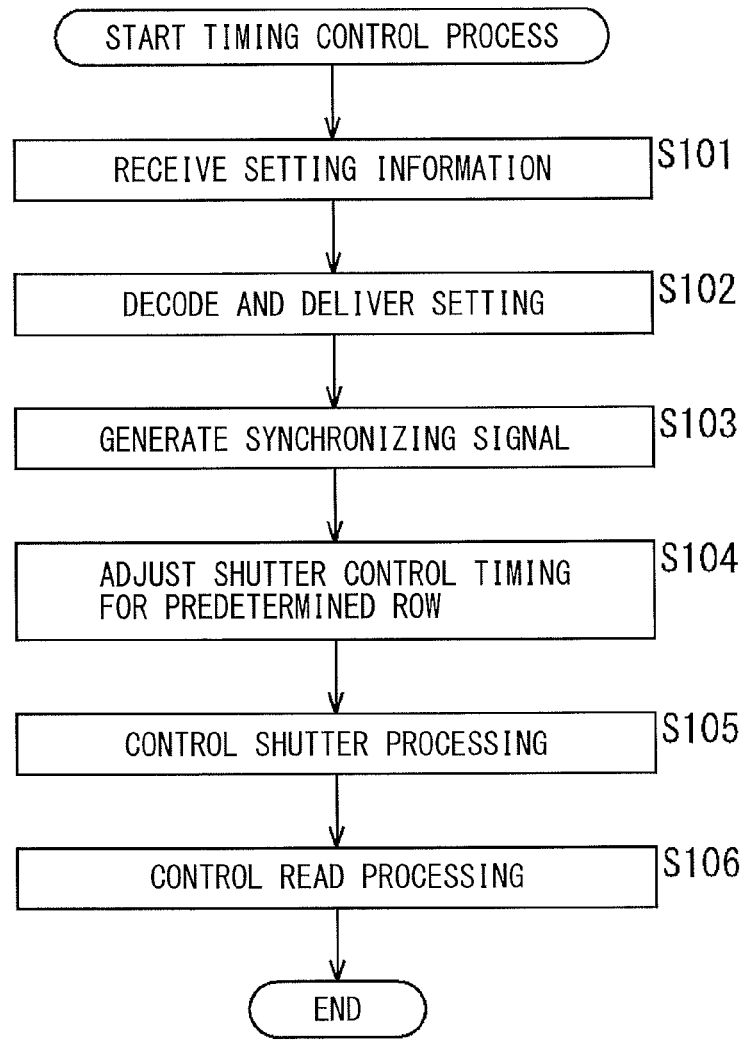
FIG. 7 is a flowchart explaining an exemplary flow of a timing control process.

An exemplary flow of a timing control process performed by the timing control section 112 is now described with reference to a flowchart of FIG. 7.

When the timing control process is started, the external interface 151 receives externally supplied setting information in step S101.

In step S102, the operation setting section 152 decodes the setting received in step S101, and controls length of a horizontal synchronizing signal for a predetermined row in a frame, and delivers control information, on which such control is reflected, to each processing section. In other words, a frame rate is finely adjusted.

In step S103, the synchronizing signal generation section 153 generates a synchronizing signal subjected to fraction adjustment based on the processing results in step S102.

In step S104, the timing adjustment section 154 adjusts electronic shutter timing (also referred to as shutter control timing) of a predetermined row the exposure time of which is affected by the fraction adjustment performed in step S102.

In step S105, the shutter control section 156 controls electronic shutter processing at the electronic shutter timing, which is adjusted in step S104 and based on the synchronizing signal subjected to the fraction adjustment in step S102.

In step S106, the read control section 155 controls charge read processing at timing based on the synchronizing signal subjected to the fraction adjustment in step S102.

When the processing of step S106 is finished, the timing control process is finished.

Figure 8:
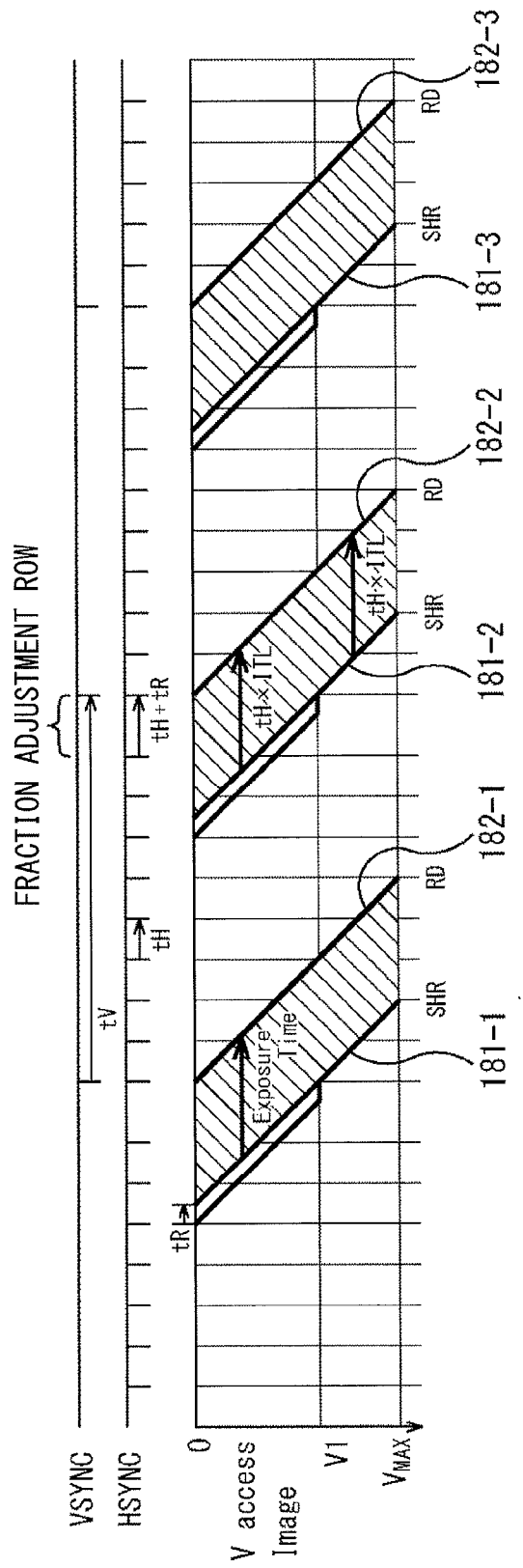
FIG. 8 is a diagram illustrating an exemplary state of electronic shutter timing adjustment.

The timing control process is performed as described above, thereby electronic shutter timing (SHR) of each row is represented as a straight line such as straight lines 181-1 to 181-3 illustrated in FIG. 8. The timing (RD) of read processing is still represented as a straight line such as straight lines 182-1 to 182-3, as in the case of FIG. 3. Specifically, exposure time of each row becomes even (constant) in a frame.

Specifically, the timing control section 112 adjusts the electronic shutter timing in correspondence to fine adjustment of a frame rate such that exposure time is even in a frame. Consequently, the timing control section 112 more accurately achieves a desired frame rate. In other words, the CMOS image sensor 100 finely adjusts a frame rate while suppressing degradation in image quality of an output image.

[Another Example of Timing Control Section]

For which row and to what degree the timing adjustment section 154 adjusts electronic shutter timing may be determined by a result of determination of exposure time of each row, the determination being made based on the setting information decoded by the operation setting section 152.

Figure 9:
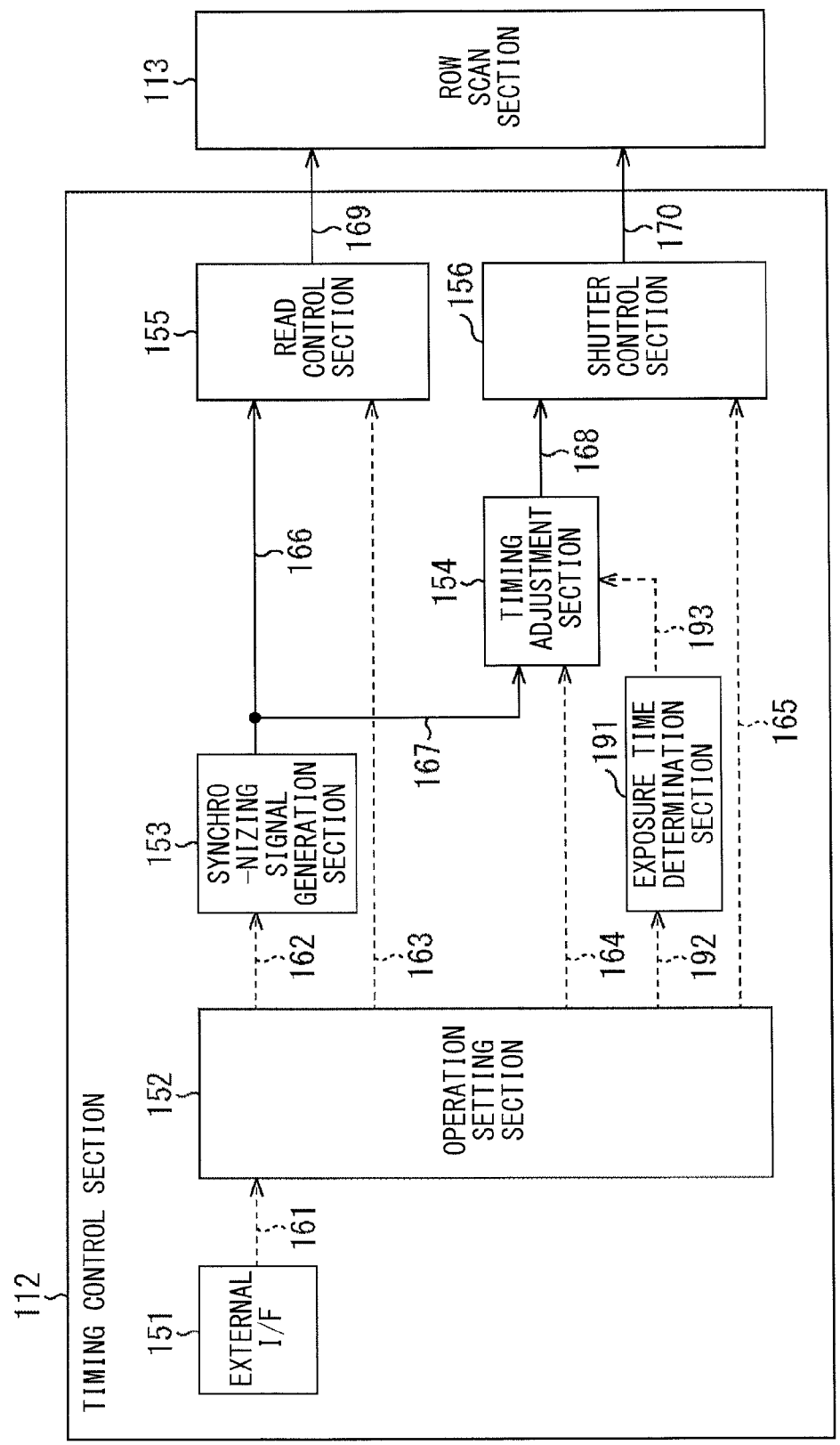
FIG. 9 is a diagram illustrating another exemplary configuration of the timing control section.

FIG. 9 is a block diagram illustrating an exemplary main configuration of the timing control section 112 in such a case. In the exemplary case illustrated in FIG. 9, the timing control section 112 includes an exposure time determination section 191 in addition to the exemplary configuration of FIG. 6.

The operation setting section 152 supplies information on a synchronizing signal subjected to fraction adjustment to the exposure time determination section 191 (arrow 192). For example, the operation setting section 152 may supply, to the exposure time determination section 191, information on a row for which the synchronizing signal is subjected to fraction adjustment and on the amount of such fraction adjustment, as the information on the synchronizing signal subjected to fraction adjustment.

The exposure time determination section 191 calculates exposure time of each row based on the information supplied from the operation setting section 152. The exposure time determination section 191 then determines adjustment amount of electronic shutter timing of each row such that the calculated exposure time of each row is constant. The exposure time determination section 191 supplies information indicating the adjustment amount of electronic shutter timing of the row to the timing adjustment section 154 (arrow 193). The timing adjustment section 154 adjusts the electronic shutter timing of each row based on the supplied information.

[Flow of Timing Control Process]

Figure 10:
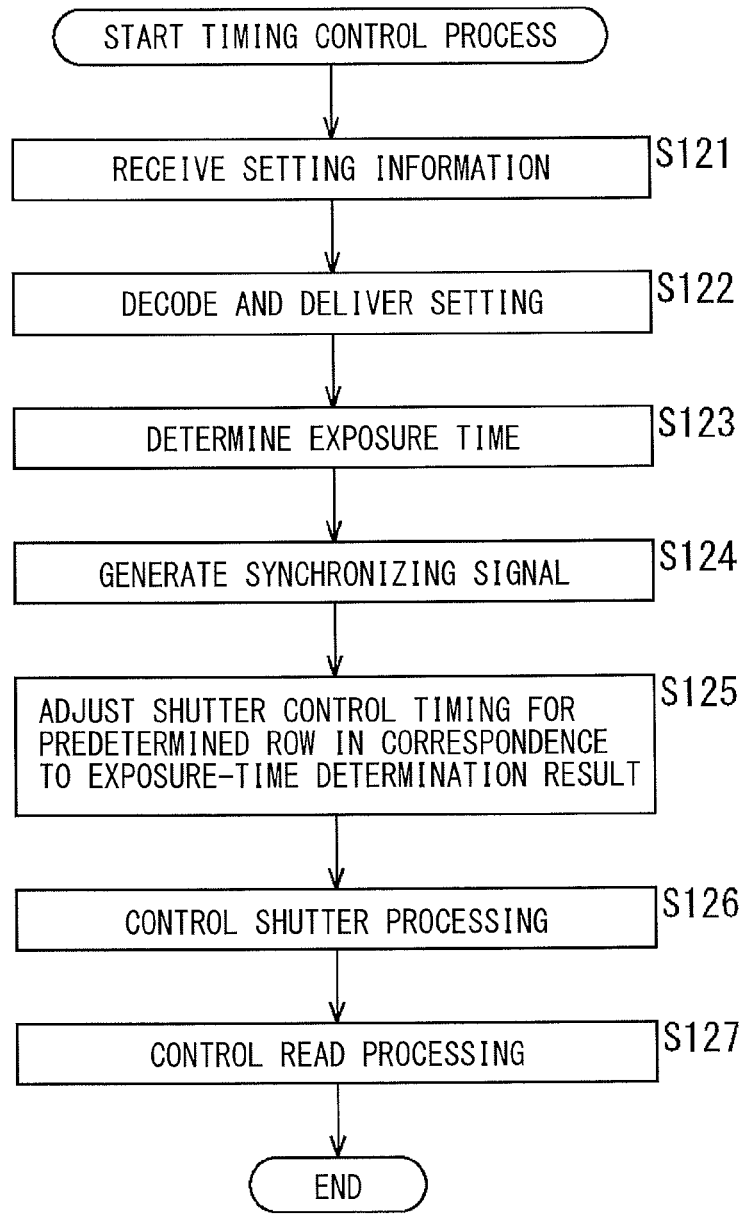
FIG. 10 is a flowchart explaining another exemplary flow of the timing control process.

An exemplary flow of a timing control process performed by the timing control section 112 in this case is now described with reference to a flowchart of FIG. 10.

When the timing control process is started, the external interface 151 receives externally supplied setting information in step S121.

In step S122, the operation setting section 152 decodes the setting received in step S121, and controls length of a horizontal synchronizing signal for a predetermined row in a frame, and delivers control information, on which such control is reflected, to each processing section. In other words, a frame rate is finely adjusted.

In step S123, the exposure time determination section 191 determines exposure time of each row.

In step S124, the synchronizing signal generation section 153 generates a synchronizing signal subjected to fraction adjustment based on the processing results in step S122.

In step S125, the timing adjustment section 154 adjusts shutter control timing of a predetermined row to be affected by the fraction adjustment in correspondence to the exposure time determined in step S123.

In step S126, the shutter control section 156 controls electronic shutter processing at the electronic shutter timing, which is adjusted in step S125 and based on the synchronizing signal subjected to the fraction adjustment in step S122.

In step S127, the read control section 155 controls charge read processing at timing based on the synchronizing signal subjected to the fraction adjustment in step S122.

When the processing of step S127 is finished, the timing control process is finished.

Through such operation, the timing control section 112 adjusts the electronic shutter timing in correspondence to fine adjustment of a frame rate such that exposure time is even in a frame. Consequently, the timing control section 112 more accurately achieves a desired frame rate. In other words, the CMOS image sensor 100 finely adjusts a frame rate while suppressing degradation in image quality of an output image.

In this way, exposure time is determined in the inside of the timing control section 112. Thereby, even if the timing control section 112 determines, in its inside (for example, the operation setting section 152), adjustment amount of fraction adjustment of a synchronizing signal and a row on which fraction adjustment is performed, the timing control section 112 is allowed to adjust the electronic shutter timing in correspondence to the fine adjustment of the frame rate such that exposure time is even in a frame. Specifically, for example, adjustment amount of fraction adjustment of a synchronizing signal and a row on which fraction adjustment is performed are not necessary to be specified by the setting information from outside of the timing control section 112 (CMOS image sensor 100), and thus design is facilitated.

For example, as in the example of FIG. 2, in the case where fraction adjustment is performed on one row, two types of length of exposure time are given as represented by the Expressions (5) and (6). Hence, the exposure time determination section 191 may determine a row (changing point) at which the length of exposure time is varied. In the exemplary case of FIG. 3, this changing point is V1. Specifically, in this case, a processing result substantially similar to determination of exposure time of each row is provided by specifying this changing point. In other words, the timing control process is more easily performed.

2. Second Embodiment

Generation of Synchronizing Signal

In a typical image pickup device such as, for example, a CMOS image sensor, a synchronizing signal that serves as a basis of processing performed in the inside of the image pickup device is generated using an internal clock generated in the inside of the image pickup device, the internal clock being asynchronous to an external clock sent from outside of the image pickup device.

The internal clock is generated using the external clock. Hence, processing time for one row is necessary to be considered in consideration of a ratio between the external clock and the internal clock to more accurately achieve a frame rate specified from outside (host).

For example, processing time (tF) for one frame may be represented as the following Expression (9) using the number of rows (FV lines) in one frame and processing time (tH) for one row. The processing time (tH) for one row is represented as the following Expression (10) using a cycle ECK of an external clock and a parameter (cE) that determines processing time for one row on the basis of the external clock.

[Numerical Expression 7]

$$(tF)=(tH)\times(FV \text{ lines}) \quad (9)$$

$$(tH)=ECK\times(cE) \quad (10)$$

For example, a relationship between the cycle (ECK) of the external clock and the cycle (ICK) of the internal clock may be defined as the following Expression (11).

[Numerical Expression 8]

$$(ICK)=k\times ECK \quad (11)$$

In this case, the processing time (tH) for one row on the basis of the internal clock is represented as the following Expression (12). [Numerical Expression 9]

$$(tH)=JCK\times 1/k\times(cE) \quad (12)$$

At this time, if $(1/k\times(cE))$ in the Expression (12) is a divisible number, no difficulty exists. If, however, $(1/k\times(cE))$ is indivisible, $(1/k\times(cE))$ is necessary to have a value such that the number of rows (FV lines) is divisible by the remainder. If such a condition is not satisfied, as described in the first embodiment, a temporal error may occur every frame, and errors accumulated over a plurality of frames may cause a frame shift.

[Measurement of Horizontal Synchronizing Signal]

Therefore, length of a horizontal synchronizing signal, serving as a basis of charge read processing that reads charge from a pixel array on a row basis and based on an external clock, is measured using an internal clock that is asynchronous to the external clock, to generate a parameter that determines processing time for one row on the basis of the internal clock, and the horizontal synchronizing signal that is based on the internal clock is generated using the determined parameter.

In this way, the horizontal synchronizing signal based on the external clock is measured based on the internal clock. Thereby, any parameter is more accurately converted into a parameter that is based on the internal clock. Consequently, a desired frame rate is more accurately achieved regardless of a ratio between the external clock and the internal clock.

[CMOS Image Sensor]

An example embodiment of the present technology is now described using a more specific example. For example, the above-described example embodiment of the technology may be applied to the synchronizing signal generation section 153 of the timing control section 112 of the CMOS image sensor 100 illustrated in FIG. 4. However, any configuration other than the synchronizing signal generation section 153 is optional, i.e., the configuration illustrated in FIG. 4 may be partially omitted, or any configuration other than the configuration illustrated in FIG. 4 may be provided.

[Synchronizing Signal Generation According to Comparative Example]

Figure 11:
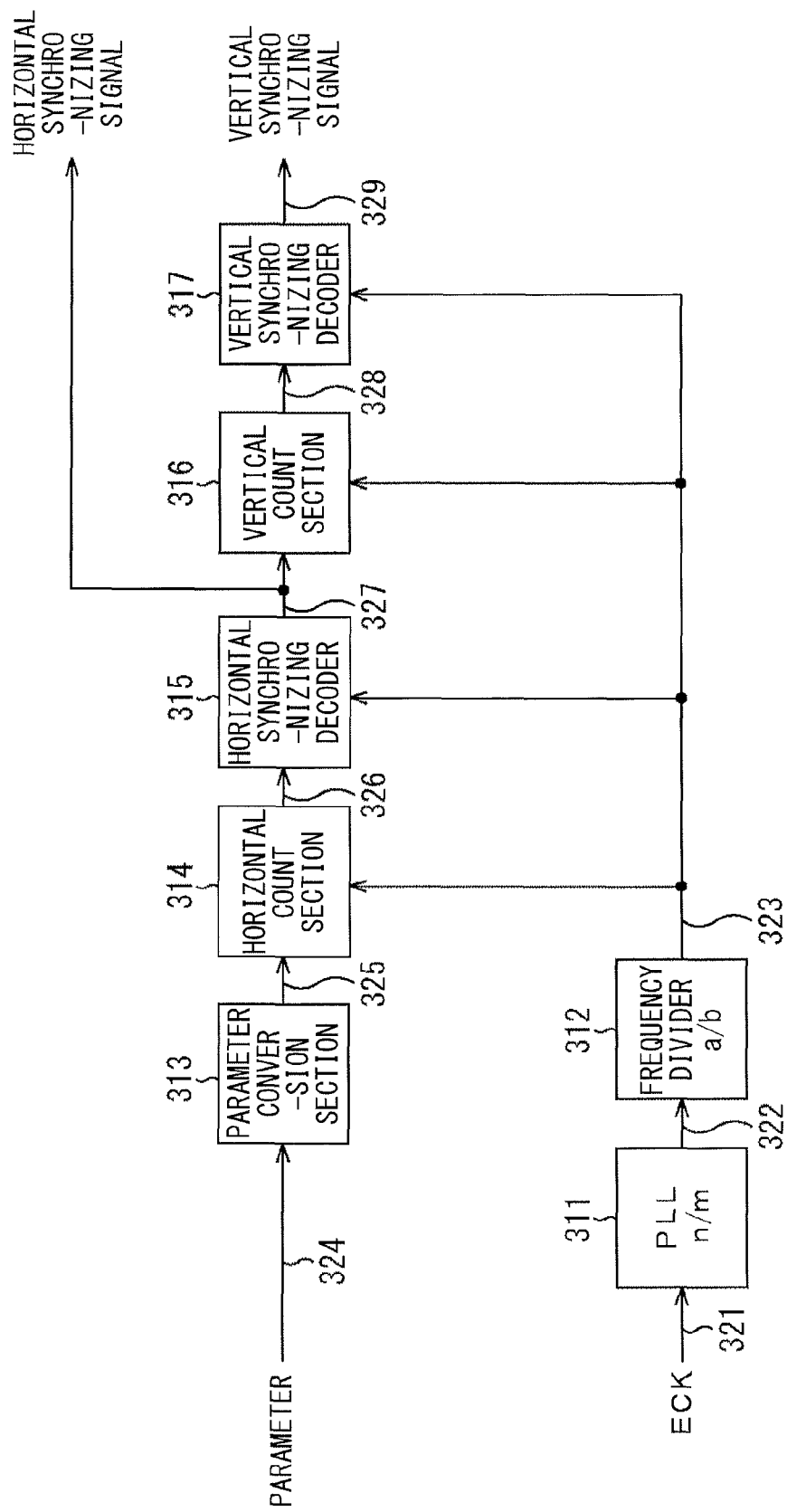
FIG. 11 is a diagram illustrating an exemplary main configuration of a synchronizing signal generation section according to a comparative example.

FIG. 11 is a block diagram illustrating an exemplary main configuration of a synchronizing signal generation section 153 according to a comparative example.

As illustrated in FIG. 11, the synchronizing signal generation section 153 includes PLL 311, a frequency divider 312, a parameter conversion section 313, a horizontal count section 314, a horizontal synchronizing decoder 315, a vertical count section 316, and a vertical synchronizing decoder 317.

The PLL 311 receives an external clock (ECK) supplied from outside of the synchronizing signal generation section 153 (arrow 321). The PLL 311 multiplies the supplied external clock (ECK) at a multiplication rate (n/m), and supplies the multiplied clock to the frequency divider 312 (arrow 322).

The frequency divider 312 divides the multiplied clock supplied from the PLL 311 at a dividing rate (a/b), and supplies the divided clock, as an internal clock, to the horizontal count section 314 to the vertical synchronizing decoder 317 (arrow 323).

Specifically, a cycle (ICK) of an internal clock is represented as the following Expression (13).

[Numerical Expression 10]

$$ICK=ECK\times(n/m)\times(a/b) \quad (13)$$

The parameter conversion section 313 receives from outside thereof a parameter that is based on an external clock. The parameter sets processing time (tH) for one row specified from outside of the synchronizing signal generation section 153 (arrow 324).

The parameter conversion section 313 converts the parameter based on the external clock into a parameter based on the internal clock (into a parameter in ICK). The parameter conversion section 313 supplies the converted parameter to the horizontal count section 314 (arrow 325). Since the parameter based on the external clock is represented as (tH/ECK), the converted parameter $P_{ICK}$ is represented as the following Expression (14).

[Numerical Expression 11]

$$P=(tH/ECK)/(n/m)/(a/b) \quad (14)$$

The horizontal count section 314 counts, based on the internal clock (ICK), the processing time for one row using the converted parameter. The horizontal count section 314 supplies the resultant horizontal count value to the horizontal synchronizing decoder 315 (arrow 326).

The horizontal synchronizing decoder 315 generates, based on the internal clock (ICK), a horizontal synchronizing signal that is based on the internal clock from the supplied horizontal count value. The horizontal synchronizing decoder 315 supplies the generated horizontal synchronizing signal to each of processing sections of the CMOS image sensor 100 that operates based on the horizontal synchronizing signal (arrow 327). The horizontal synchronizing decoder 315 also supplies the generated horizontal synchronizing signal to the vertical count section 316 (arrow 327).

In other words, the horizontal count section 314 and the horizontal synchronizing decoder 315 generate the horizontal synchronizing signal that is based on the internal clock from the parameter in internal clock terms.

The vertical count section 316 counts, based on the horizontal synchronizing signal that is based on the internal clock supplied from the horizontal synchronizing decoder 315, the number of rows in a frame. The vertical count section 316 supplies the resultant vertical count value to the vertical synchronizing decoder 317 (arrow 328).

The vertical synchronizing decoder 317 generates, based on the internal clock (ICK), a vertical synchronizing signal that is based on the internal clock from the supplied vertical count value. The vertical synchronizing decoder 317 supplies the generated vertical synchronizing signal to each of the processing sections of the CMOS image sensor 100 that operates based on the vertical synchronizing signal (arrow 329).

In other words, the vertical count section 316 and the vertical synchronizing decoder 317 generate the vertical synchronizing signal based on the internal clock from the horizontal synchronizing signal based on the internal clock.

At this time, if (n/m)×(a/b) is an indivisible number, length of horizontal signal for one frame may have an error with respect to processing time for one frame corresponding to a target frame rate. Even if (n/m)×(a/b) is divisible, a scale of the parameter conversion section may be greatly varied depending on a set parameter.

[Synchronizing Signal Generation to which Example Embodiment of the Technology is Applied]

Figure 12:
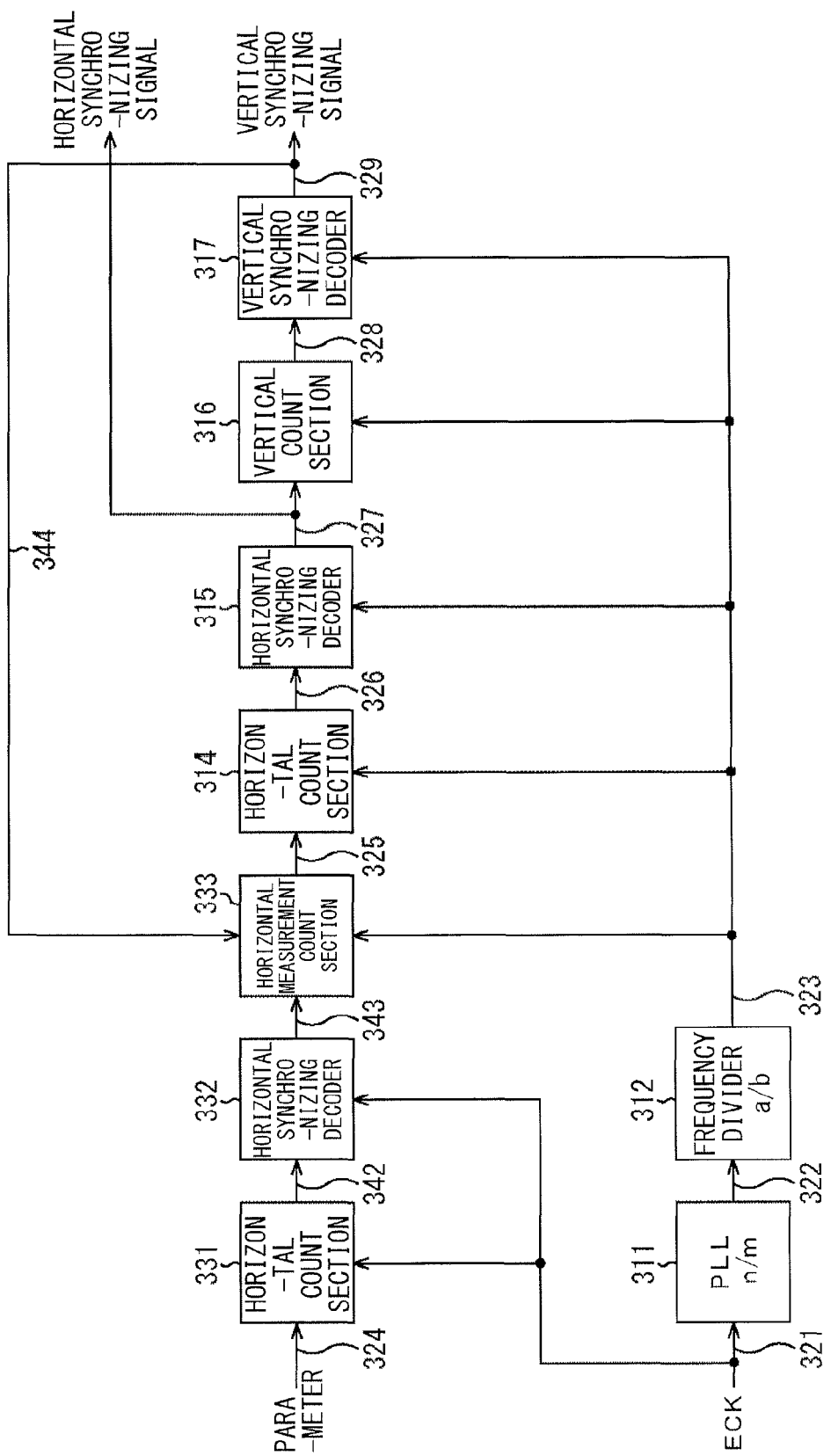
FIG. 12 is a diagram illustrating another exemplary configuration of the synchronizing signal generation section.

FIG. 12 illustrates an exemplary major configuration of the synchronizing signal generation section 153 to which an example embodiment of the technology is applied.

In the exemplary case illustrated in FIG. 12, the synchronizing signal generation section 153 includes a horizontal count section 331, a horizontal synchronizing decoder 332, and a horizontal measurement count section 333 in place of the parameter conversion section 313 in the exemplary configuration illustrated in FIG. 11.

The horizontal count section 331 receives an external clock (ECK) (arrow 341) and a parameter that is based on the external clock (arrow 324) from outside of the synchronizing signal generation section 153. The parameter sets processing time (tH) for one row specified from outside of the synchronizing signal generation section 153. The horizontal count section 331 counts, based on the external clock, the processing time for one row using the parameter that is based on the external clock, and generates a horizontal count value that is based on the external clock. The horizontal count section 331 supplies the generated horizontal count value to the horizontal synchronizing decoder 332 (arrow 342).

The horizontal synchronizing decoder 332 also receives the external clock (arrow 341). The horizontal synchronizing decoder 332 generates, based on the external clock, a horizontal synchronizing signal for measurement that is based on the external clock from the supplied horizontal count value. The horizontal synchronizing decoder 332 supplies the generated horizontal synchronizing signal for measurement to the horizontal measurement count section 333 (arrow 343).

In other words, the horizontal count section 331 and the horizontal synchronizing decoder 332 generate the horizontal synchronizing signal for measurement that is based on the external clock.

The horizontal measurement count section 333 also receives an internal clock from the frequency divider 312 (arrow 323). Furthermore, the horizontal measurement count section 333 receives a vertical synchronizing signal that is based on the internal clock from the vertical synchronizing decoder 317 (arrow 344).

The horizontal measurement count section 333 measures, based on the internal clock, the horizontal synchronizing signal for measurement supplied from the horizontal synchronizing decoder 332, thereby converts a parameter based on the external clock, the parameter setting the processing time (tH) for one row, into a parameter in ICK.

The horizontal measurement count section 333 supplies the parameter converted in ICK to the horizontal count section 314 (arrow 325).

Through such operation, the synchronizing signal generation section 153 achieves conversion from the external clock (ECK) to the internal clock (ICK) using only a measurement circuit (counter) without using an arithmetic circuit. Hence, the synchronizing signal generation section 153 achieves a more simple and inexpensive circuit configuration, and meets more various parameters. As a result, the timing control section 112 more accurately achieves a desired frame rate.

Consequently, even if a timing reference clock (external clock) of a frame-rate-based generation section is asynchronous to a timing reference clock (internal clock) of an imager-drive-based generation section, the CMOS image sensor 100 suppresses a frame rate error, and thus more accurately achieves desired frame rate.

[Generation of Horizontal Synchronizing Signal]

Figure 13:
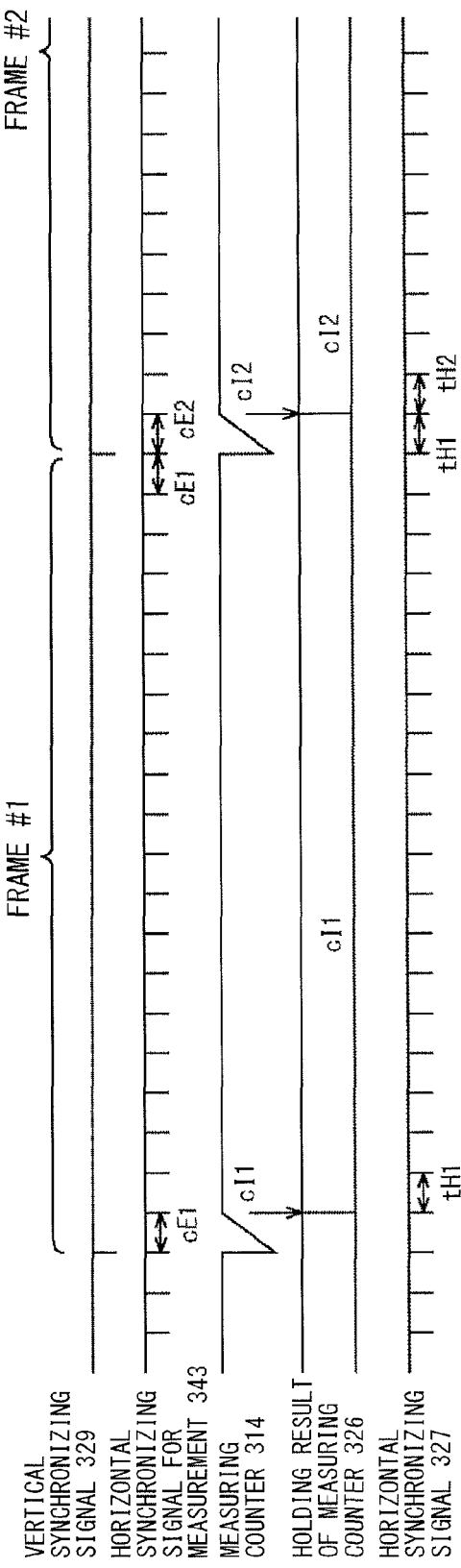
FIG. 13 is a diagram explaining an exemplary state of generation of a horizontal synchronizing signal.

FIG. 13 illustrates an exemplary state of generation of a horizontal synchronizing signal as described above.

The horizontal synchronizing signal for measurement is a signal obtained by decoding a particular position as a result of count of parameters on the basis of the external clock (ECK) (a parameter based on ECK in frame #1 is defined as (cE1)). In the exemplary case of FIG. 13, the signal indicates negative logic synchronization, and a signal interval is equal to the processing time (tH) for one row.

As described above, the horizontal measurement count section 333 measures the horizontal synchronizing signal for measurement, thereby the parameter is converted into a parameter in ICK (a parameter converted in ICK in frame #1 is defined as (cI1)). An imager incorporating a column ADC that performs A/D conversion in rows performs A/D conversion processing in rows. Hence, if processing time for each row is not constant, difficulty may be caused in A/D conversion characteristics.

Therefore, measurement of processing time for one row performed by the horizontal measurement count section 333 may be limited to once per frame. Alternatively, for example, horizontal measurement count section 333 may perform measurement of processing time for one row over a plurality of rows, and may calculate an average of the measured values.

Moreover, as described above, processing time for each row to be subjected to A/D conversion is necessary to be constant. Therefore, a row, on which the horizontal measurement count section 333 performs measurement, may be limited to a row to be not subjected to A/D conversion, for example, a row in a blanking period. In other words, performing measurement by the horizontal measurement count section 333 may be prohibited for the row to be subjected to A/D conversion.

The horizontal measurement count section 333 determines a measurement result within one frame, and holds the determined value as a measurement counter result during processing of that frame, and allows one frame operation to be performed with the value. This suppresses a phenomenon of uneven processing time for one row in a frame.

The PLL 311, the frequency divider 312, and the horizontal count section 314 to the vertical synchronizing decoder 317 each basically perform processing as with the exemplary case of FIG. 11. The horizontal synchronizing decoder 317, however, also supplies the vertical synchronizing signal to the horizontal measurement count section 333. The horizontal measurement count section 333 recognizes a position (row number) of a row to be measured in a frame based on the vertical synchronizing signal.

[Flow of Synchronizing Signal Control Process]

An exemplary flow of a synchronizing signal control process performed by the synchronizing signal generation section 153 as described above is now described with reference to a flowchart of FIG. 14.

When the synchronizing signal control process is started, in step S301, the horizontal count section 331 counts processing time for one row on the externally supplied clock ECK using an externally supplied parameter.

In step S302, the horizontal synchronizing decoder 332 generates a horizontal synchronizing signal for measurement from the externally supplied clock ECK using the horizontal count value calculated in step S301.

In step S303, the PLL 311 and the frequency divider 312 convert the externally supplied clock ECK into the internal drive clock ICK.

In step S304, the horizontal measurement count section 333 measures the horizontal synchronizing signal for measurement using the internal drive clock ICK generated in step S303 and a vertical synchronizing signal based on the internal drive clock ICK, thereby converts an externally supplied parameter into a parameter in ICK.

In step S305, the horizontal count section 314 counts the processing time for one row on the internal drive clock ICK using the converted parameter obtained in step S304.

In step S306, the horizontal synchronizing decoder 315 generates a horizontal synchronizing signal that is based on the internal drive clock ICK, using the horizontal count value obtained in step S305.

In step S307, the vertical count section 316 counts the number of rows for one frame on the horizontal synchronizing signal obtained in step S306.

In step S308, the vertical synchronizing decoder 317 generates the vertical synchronizing signal that is based on the internal drive clock ICK, using the vertical count value.

When the processing of step S308 is finished, the synchronizing signal control process is finished.

The synchronizing signal control process is performed as described above, thereby the synchronizing signal generation section 153 more accurately achieves a desired frame rate.

[Another Exemplary Synchronizing Signal Generation Section]

The horizontal synchronizing signal for measurement may be generated on the basis of another external clock that is independent of the external clock generating the internal clock.

Figure 15:
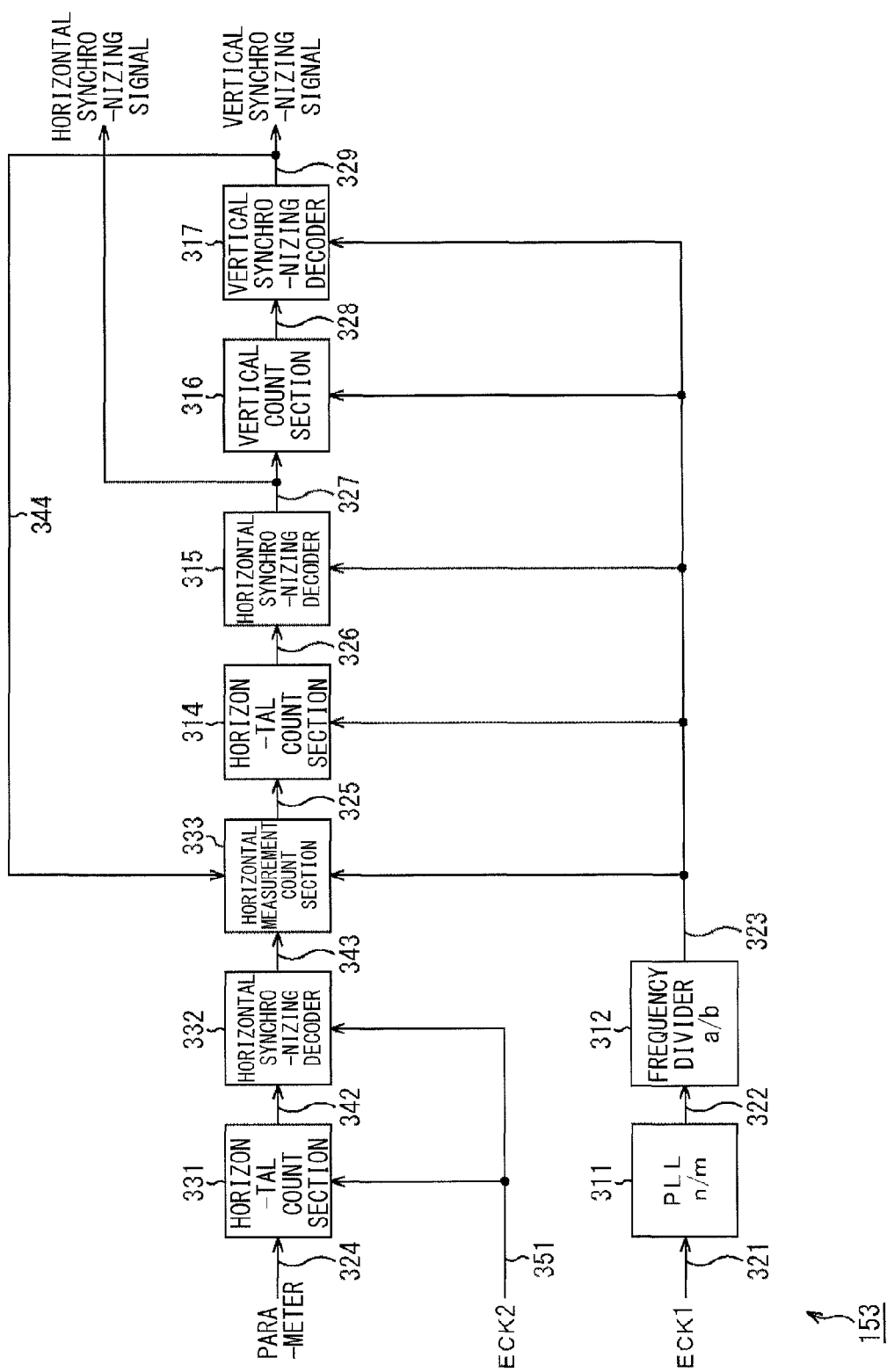
FIG. 15 is a diagram illustrating another exemplary configuration of the synchronizing signal generation section.

FIG. 15 illustrates an exemplary main configuration of the synchronizing signal generation section 153 in such a case. The synchronizing signal generation section 153 in the exemplary case of FIG. 15 includes processing sections similar to those in the exemplary case of FIG. 12. In the exemplary case of FIG. 15, however, the horizontal count section 331 and the horizontal synchronizing decoder 332 each receive another external clock ECK2 independent of the external clock ECK1 supplied to the PLL 311.

For example, the external clock ECK1 may be asynchronous to the external clock ECK2. Even in such a case, the horizontal measurement count section 333 absorbs such an asynchronous state of the external clocks during measurement, and converts the parameter into a parameter in ICK.

Hence, in this case, the horizontal count section 314 to the vertical synchronizing decoder 317 also perform processing using such a converted parameter as in the exemplary case of FIG. 12, and thus generate a horizontal synchronizing signal and a vertical synchronizing signal that are based on the internal clock and each further accurately correspond to a desired frame rate.

In other words, even if the timing reference clock of the frame-rate-based generation section is unrelated to the timing reference of the imager-drive-based generation section, the synchronizing signal generation section 153 further accurately achieves a desired frame rate without causing any error in a frame rate.

[Flow of Synchronizing Signal Control Process]

Figure 16:
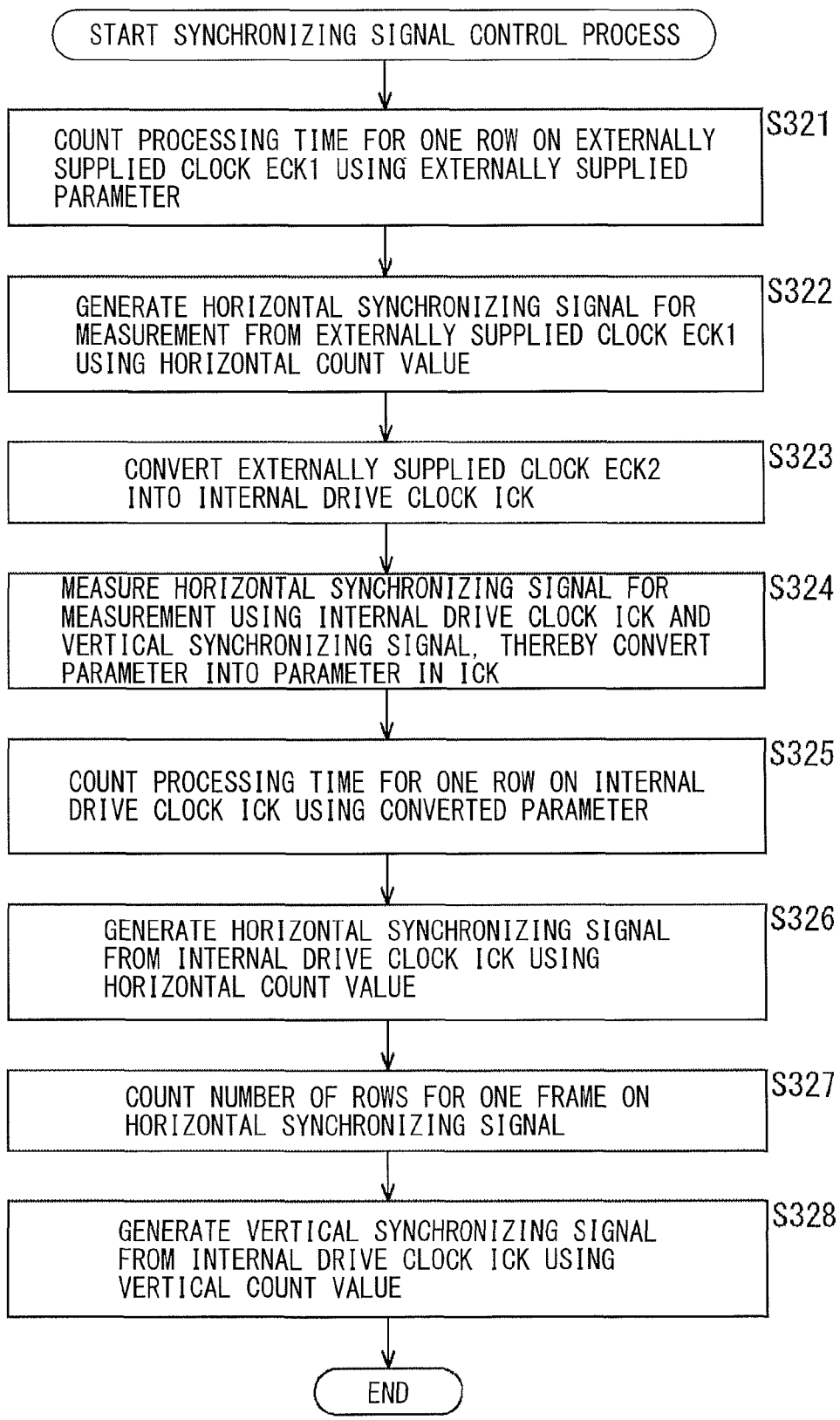
FIG. 16 is a flowchart explaining another exemplary flow of the synchronizing signal control process.

An exemplary flow of a synchronizing signal control process performed by the synchronizing signal generation section 153 in the exemplary case of FIG. 15 as described above is now described with reference to a flowchart of FIG. 16.

When the synchronizing signal control process is started, in step S321, the horizontal count section 331 counts processing time for one row on the externally supplied clock ECK1 using an externally supplied parameter.

In step S322, the horizontal synchronizing decoder 332 generates the horizontal synchronizing signal for measurement from the externally supplied clock ECK1 using the horizontal count value calculated in step S321.

In step S323, the PLL 311 and the frequency divider 312 convert the externally supplied clock ECK2 into an internal drive clock ICK.

Figure 14:
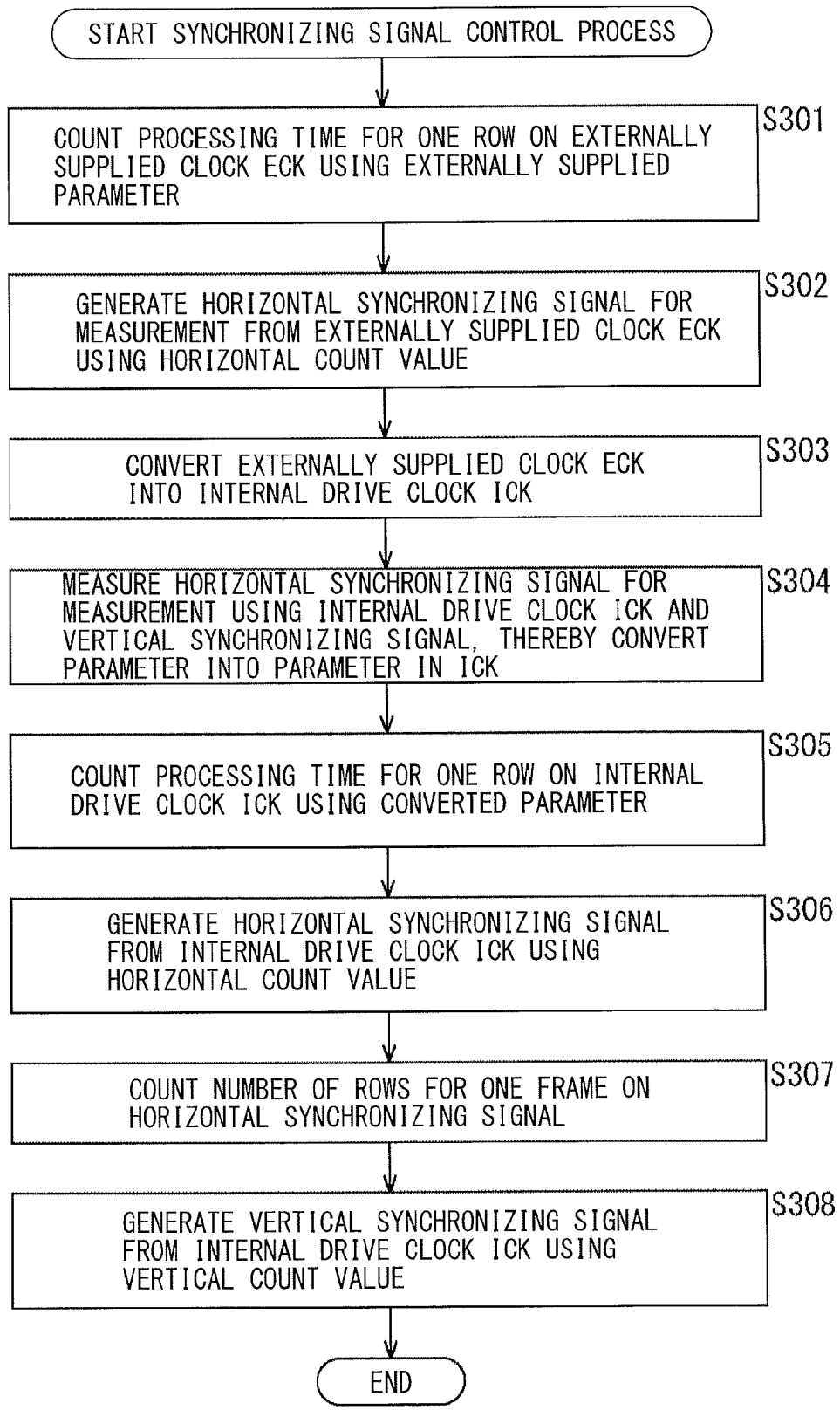
FIG. 14 is a flowchart explaining an exemplary flow of a synchronizing signal control process.

Processes of steps S324 to S328 are performed as with the processes of steps S304 to S308, respectively, in FIG. 14.

When the processing of step S328 is finished, the synchronizing signal control process is finished.

The synchronizing signal control process is performed as described above, thereby the synchronizing signal generation section 153 more accurately achieves a desired frame rate, even if the external clock serving as a basis of the horizontal synchronizing signal for measurement is asynchronous to the external clock serving as a basis of the internal clock.

[Still Another Exemplary Synchronizing Signal Generation Section]

The horizontal synchronizing signal for measurement may be externally supplied.

Figure 17:
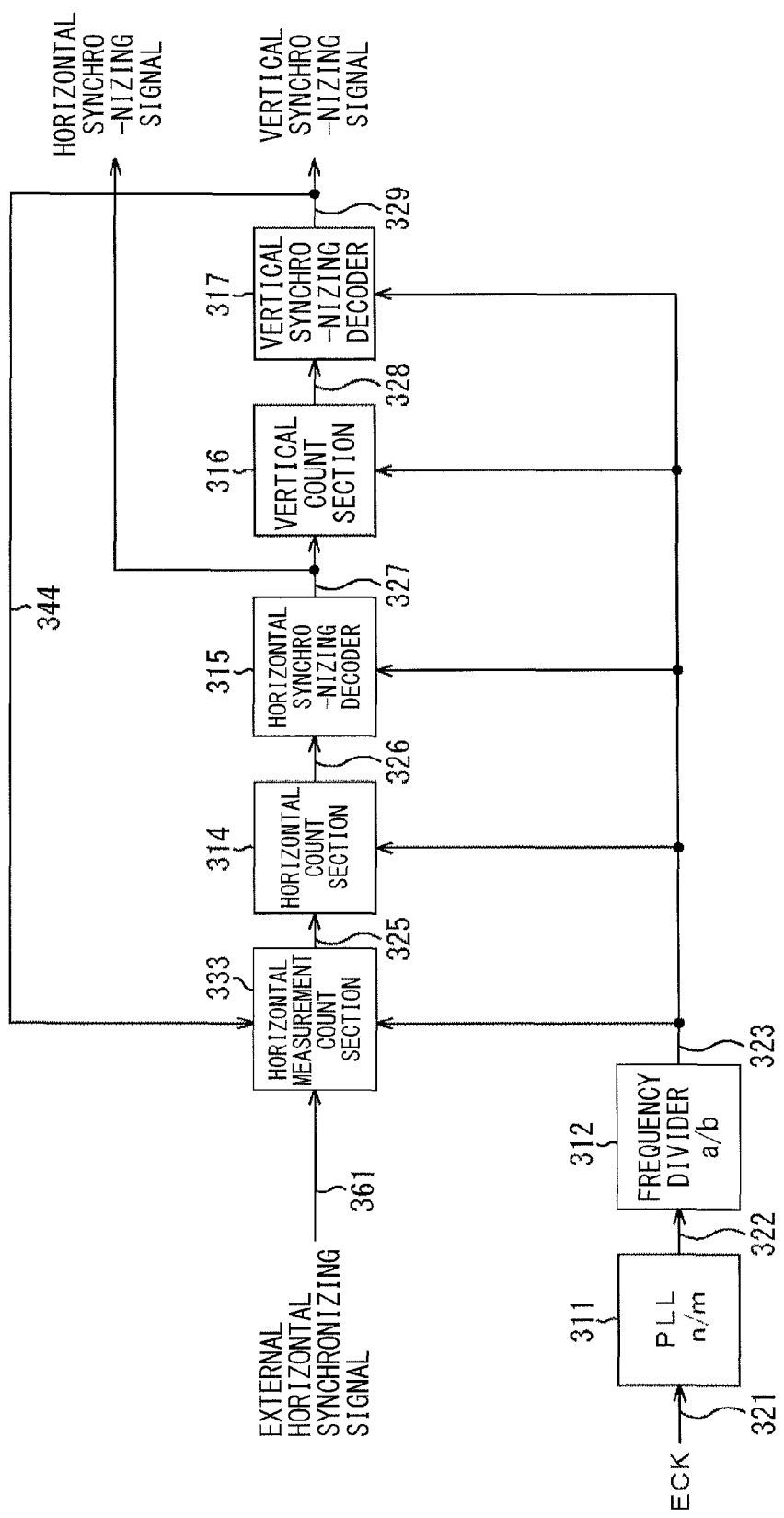
FIG. 17 is a diagram illustrating another exemplary configuration of the synchronizing signal generation section.

FIG. 17 illustrates an exemplary main configuration of the synchronizing signal generation section 153 in such a case. The synchronizing signal generation section 153 in the exemplary case of FIG. 17 has a configuration similar to the configuration in the exemplary case of FIG. 12 except that the horizontal count section 331 and the horizontal synchronizing decoder 332 are omitted, and thus the horizontal measurement count section 333 receives a horizontal synchronizing signal from outside of the synchronizing signal generation section 153 (arrow 361). The horizontal synchronizing signal is a signal based on an external clock.

The horizontal measurement count section 333 performs measurement as in the exemplary case of FIG. 12 or 15 with the externally supplied horizontal synchronizing signal as a horizontal synchronizing signal for measurement, and thus converts a parameter into a parameter in ICK. The horizontal measurement count section 333 supplies the converted parameter to the horizontal count section 314 (arrow 325).

The PLL 311, the frequency divider 312, and the horizontal count section 314 to the vertical synchronizing decoder 317 each perform processing similar to that in the exemplary case of FIG. 12 or 15.

Hence, in this case, the horizontal count section 314 to the vertical synchronizing decoder 317 also generate a horizontal synchronizing signal and a vertical synchronizing signal that are based on the internal clock and each further accurately correspond to a desired frame rate.

In other words, even if the external horizontal synchronizing signal is unrelated to the timing reference clock of the imager drive based generation section, the synchronizing signal generation section 153 further accurately achieves a desired frame rate without causing any error in a frame rate.

[Flow of Synchronizing Signal Control Process]

Figure 18:
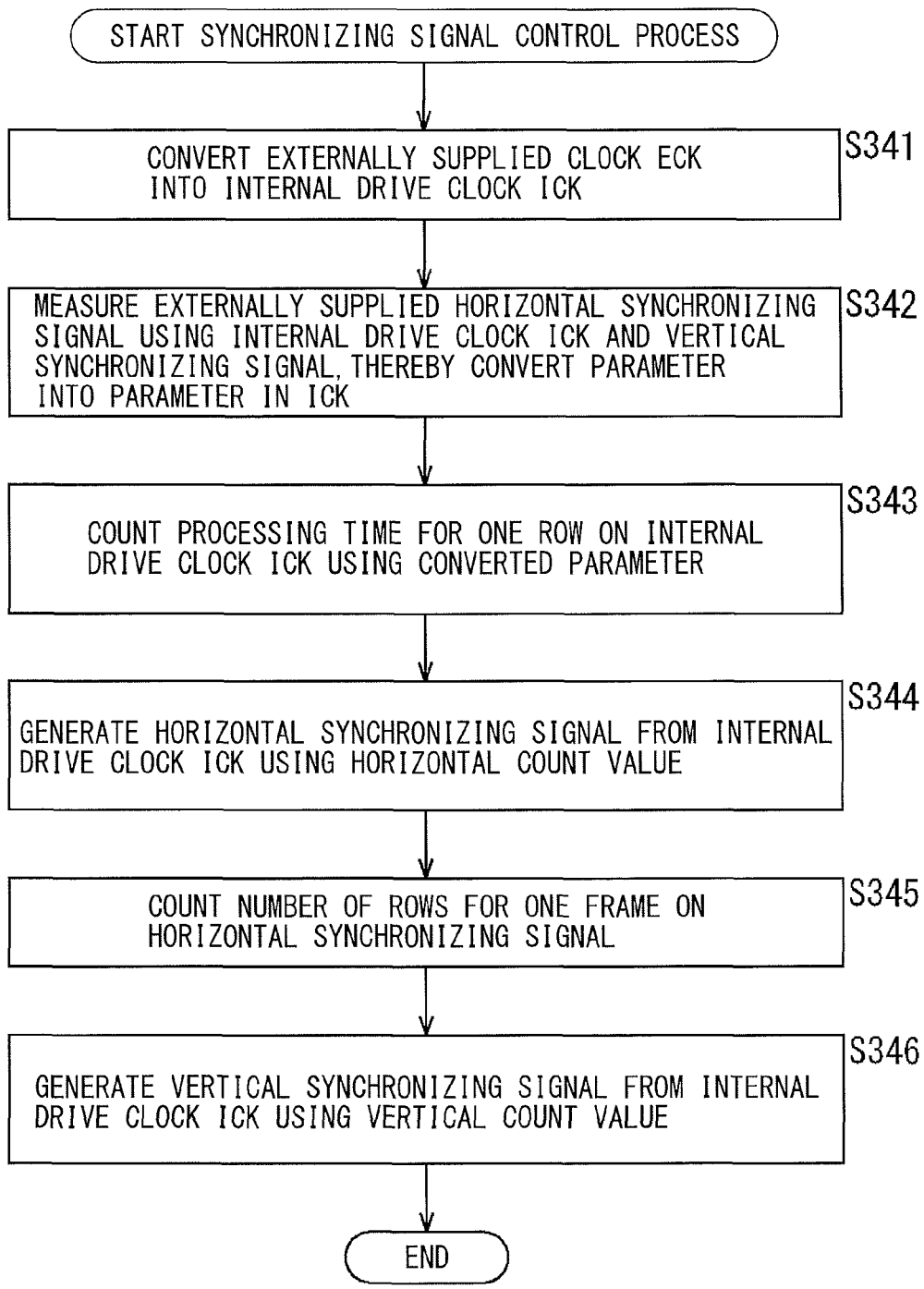
FIG. 18 is a flowchart explaining another exemplary flow of the synchronizing signal control process.

An exemplary flow of a synchronizing signal control process performed by the synchronizing signal generation section 153 of FIG. 17 as described above is now described with reference to a flowchart of FIG. 18.

When the synchronizing signal control process is started, in step S341, the PLL 311 and the frequency divider 312 convert an externally supplied clock ECK into an internal drive clock ICK.

In step S342, the horizontal measurement count section 333 measures an externally supplied horizontal synchronizing signal using the internal drive clock ICK generated in step S341 and a vertical synchronizing signal based on the internal drive clock ICK, and thus converts a parameter into a parameter in ICK.

Processes of steps S343 to S346 are performed as with the processes of steps S305 to S308, respectively, in FIG. 14.

When the process of step S346 is finished, the synchronizing signal control process is finished.

The synchronizing signal control process is performed as described above, thereby the synchronizing signal generation section 153 more accurately achieves a desired frame rate.

3. Third Embodiment

Image Pickup Apparatus

Figure 19:
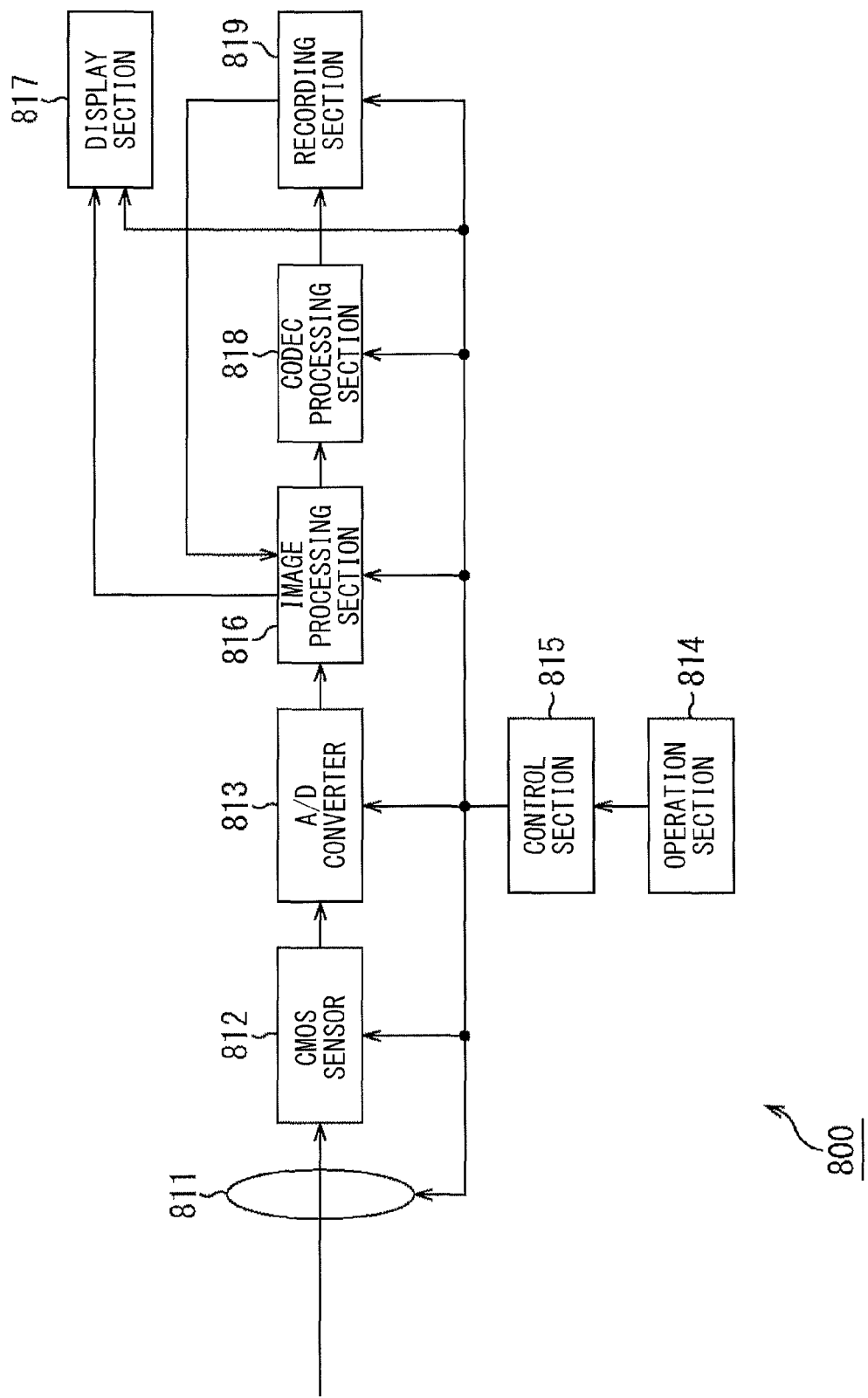
FIG. 19 is a diagram illustrating an exemplary main configuration of an image pickup apparatus.

FIG. 19 is a block diagram illustrating an exemplary main configuration of an image pickup apparatus using the above-described signal processing unit. An image pickup apparatus 800 illustrated in FIG. 19 is an apparatus configured to capture an image of an object, and to output the image of the object in a form of electric signals.

As illustrated in FIG. 19, the image pickup apparatus 800 includes an optical section 811, a CMOS sensor 812, an A/D converter 813, an operation section 814, a control section 815, an image processing section 816, a display section 817, a codec processing section 818, and a recording section 819.

The optical section 811 may be configured of: a lens that adjusts a focal point to an object, and collects light from a focused position; an aperture stop that adjusts exposure; and a shutter that controls image pickup timing, etc. The optical section 811 may transmit light (incident light) from the object, and supplies the light to the CMOS sensor 812.

The CMOS sensor 812 may perform photoelectric conversion on the incident light, and supplies a signal (pixel signal) of each pixel to the A/D converter 813.

The A/D converter 813 may convert the pixel signal, which is supplied from the CMOS sensor 812 at predetermined timing, into digital data (image data), and may sequentially supply the digital data to the image processing section 816 at predetermined timing.

For example, the operation section 814 may be configured of Jog Dial (trademark), a key, a button, or a touch panel, etc., and may receive operation input by a user, and may supply a signal corresponding to the operation input to the control section 815.

The control section 815 may control, based on the signal corresponding to the operation input by the user sent from the operation section 814, drive of each of the optical section 811, the CMOS sensor 812, the A/D converter 813, the image processing section 816, the display section 817, the codec processing section 818, and the recording section 819 to allow each section to perform processing on image pickup.

The image processing section 816 may perform various types of image processing on the image data supplied from the A/D converter 813, the image processing including, for example, color mixture correction, black level correction, white balance adjustment, de-mosaic processing, matrix processing, gamma correction, and YC conversion. The image processing section 816 may supply the image data subjected to the image processing to the display section 817 and the codec processing section 818.

For example, the display section 817 may be configured of a liquid crystal display, etc., and may display an image of an object based on the image data supplied from the image processing section 816.

The codec processing section 818 may perform a predetermined type of coding process on the image data supplied from the image processing section 816, and may supply the resultant coded data to the recording section 819.

The recording section 819 may record the corded data from the codec processing section 818. The corded data recorded in the recording section 819 may be read and decoded by the image processing section 816 as necessary. The image data obtained through the decoding process may be supplied to the display section 817 on which a corresponding image is then displayed.

One of the above-described embodiments of the present technology is applied to a processing section including the CMOS sensor 812 and the A/D converter 813 of the image pickup apparatus 800 as described above. Specifically, the CMOS image sensor 100 in any of the above-described embodiments is used as the CMOS sensor 812. As a result, the CMOS sensor 812 more accurately achieves a desired frame rate. Consequently, the image pickup apparatus 800 achieves a higher-quality image through image pickup of an object.

The image pickup apparatus to which an example embodiment of the technology is applied may have any other configuration without being limited to the above-described configuration. For example, a CCD image sensor to which an example embodiment of the technology is applied may be used in place of the CMOS sensor 812. In addition, for example, the image pickup apparatus may be not only a digital still camera or a video camera but also an information processing apparatus having an image pickup function, such as a mobile phone, a smartphone, a tablet device, and a personal computer, etc. In addition, the image pickup apparatus may be a camera module that is mounted on (or installed as an embedded device in) another information processing apparatus for use.

4. Fourth Embodiment

Computer

The above-described sequential processing may be performed by either hardware or software.

For example, software may perform the various types of processing (for example, the timing control process and the synchronizing signal control process) performed by the timing control section 112 in the CMOS image sensor 100 of FIG. 4. It will be appreciated that software may also be used for any processing performed by any processing section other than the timing control section 112.

In the case where the sequential processing is performed by software, a program configuring the software is installed in a computer. The computer may include a computer built in special hardware, and, for example, a general-purpose personal computer capable of executing various functions through installation of various programs therein.

Figure 20:
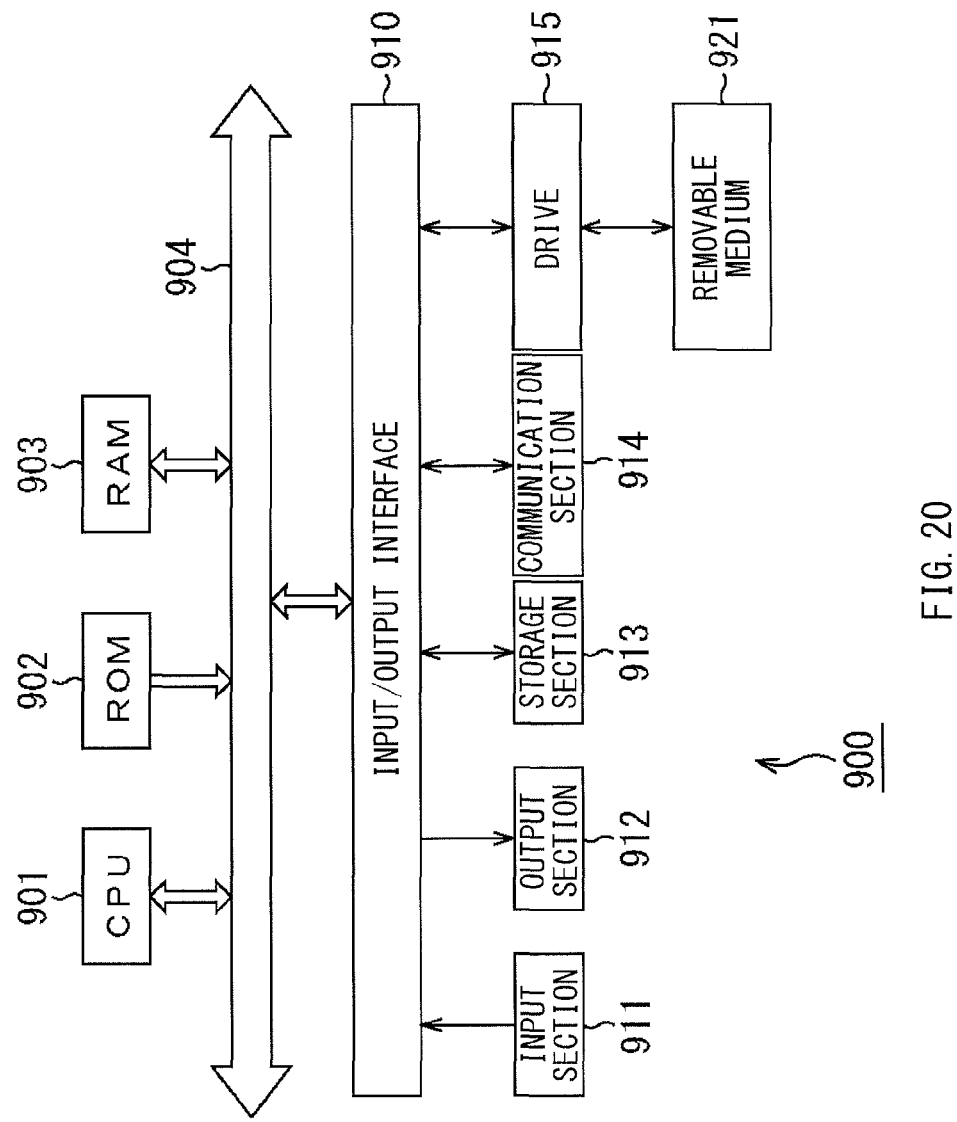
FIG. 20 is a block diagram illustrating an exemplary main configuration of a computer.

FIG. 20 is a block diagram illustrating an exemplary configuration of hardware of a computer configured to execute the sequential processing with programs.

In a computer 900 illustrated in FIG. 20, a central processing unit (CPU) 901, a read only memory (ROM) 902, and a random access memory (RAM) 903 may be connected to one another through a bus 904.

The bus 904 may also be connected to an input/output interface 910. The input/output interface 910 may be connected to an input section 911, an output section 912, a storage section 913, a communication section 914, and a drive 915.

For example, the input section 911 may be configured of a keyboard, a mouse, a microphone, a touch panel, and an input terminal. For example, the output section 912 may be configured of a display, a speaker, and an output terminal. For example, the storage section 913 may be configured of a hard disk, a RAM disk, or a nonvolatile memory. For example, the communication section 914 may be configured of a network interface. The drive 915 may drive a removable medium 921 such as a magnetic disk, an optical disk, a magneto-optical disk, or a semiconductor memory.

In the computer configured as above, for example, the CPU 901 may load a program stored in the storage section 913 into the RAM 903 through the input/output interface 910 and the bus 904, and may execute the program, so that the sequential processing may be performed. The RAM 903 may also appropriately store data necessary for execution of various types of processing by the CPU 901.

For example, the program executed by the computer (CPU 901) may be recorded in the removable medium 921 as a package medium, etc. so as to be used. The program may be provided via a wired or wireless transfer medium such as a local area network, internet, and digital satellite broadcasting.

In the computer, a program may be installed in the storage section 913 via the input/output interface 910 through insertion of the removable medium 921 storing the program into the drive 915. In addition, the program may be received by the communication section 914 via a wired or wireless transfer medium, and then may be installed in the storage section 913. Alternatively, the program may be beforehand installed in the ROM 902 or the storage section 913.

The program executed by the computer may be a program that performs processing on a time-series basis along the order described herein, or a program that performs processing in parallel or at a necessary timing, for example, timing when a call is made.

Also, herein, a step of writing the program to be recorded in a recording medium includes not only processing that is performed on a time-series basis along the described order, but also processing that is not necessarily performed on a time-series basis, i.e., performed in parallel or individually.

Further, as used herein, "system" refers to a set of a plurality of components (such as units or modules (parts)) regardless of whether all components are contained in one housing or not. Hence, a plurality of units that are contained in separate housings, and are connected to one another via a network, and one unit including a plurality of modules contained in one housing are each regarded as the system.

The configuration described as one unit (or processing section) hereinbefore may be divided and reconfigured as a plurality of units (or processing sections). Conversely, the configuration described as a plurality of units (or processing sections) hereinbefore may be collected and reconfigured as one unit (or processing section). A configuration other than the above-described configuration may be obviously added to the configuration of each unit (or each processing section). Furthermore, part of a configuration of a certain unit (or processing section) may be included in a configuration of another unit (or processing section) as long as a configuration and operation of a system as a whole are substantially not varied.

Although some embodiments of the present disclosure have been described in detail with reference to the accompanying drawings, the technical scope of the disclosure is not limited to the embodiments. It is obvious that a person having general knowledge in the technical field of the disclosure may arrive at various alterations or modifications within the scope of the technical idea according to the appended claims, and it is understood that such alterations or modifications naturally belong to the technical scope of the disclosure.

For example, an example embodiment of the present technology may have a configuration of cloud computing where processing of one function is cooperatively shared by a plurality of units via a network.

Moreover, each step described in any of the above-described flowcharts may be performed by one unit, or by a plurality of units in a shared manner.

Furthermore, in the case where one step contains a plurality of pieces of processing, the plurality of pieces of processing contained in the one step may be performed by one unit, or by a plurality of units in a shared manner.

Furthermore, the technology encompasses any possible combination of some or all of the various embodiments described herein and incorporated herein.

It is possible to achieve at least the following configurations from the above-described example embodiments of the disclosure.

(1) A signal processing unit, including:

a synchronizing signal control section configured to control length of a synchronizing signal for a predetermined row in a frame, the synchronizing signal being a basis of charge read processing that reads charge from a pixel array on a row basis; and a timing adjustment section configured to adjust timing of electronic shutter operation of unit pixels, according to the length of the synchronizing signal for the predetermined row controlled by the synchronizing signal control section.

(2) The signal processing unit according to any one of (1) and (3) to (7), wherein the timing adjustment section adjusts the timing to allow exposure time of each row to be constant.

(3) The signal processing unit according to any one of (1), (2), and (4) to (7), wherein the synchronizing signal control section controls the length of the synchronizing signal for the predetermined row within a range that is shorter than length of the synchronizing signal for one row, to allow length of the synchronizing signal for one frame to correspond to a desired frame rate.

(4) The signal processing unit according to any one of (1) to (3) and (5) to (7), wherein the synchronizing signal control section sets the predetermined row to be within a blanking period.

(5) The signal processing unit according to any one of (1) to (4) and (6) and (7), further including an exposure time determination section configured to determine exposure time of each row on which the control by the synchronizing signal control section is reflected, wherein the timing adjustment section adjusts the timing according to the exposure time determined by the exposure time determination section.

(6) The signal processing unit according to any one of (1) to (5) and (7), further including a synchronizing signal generation section configured to generate the synchronizing signal on which the control by the synchronizing signal control section is reflected, wherein the timing adjustment section adjusts the timing, according to the length of the synchronizing signal generated by the synchronizing signal generation section for the predetermined row.

(7) The signal processing unit according to any one of (1) to (6), further including:

a shutter control section configured to control the electronic shutter operation to be performed at timing adjusted by the timing adjustment section, based on the synchronizing signal on which the control by the synchronizing signal control section is reflected; and a read control section configured to control the charge read operation of the unit pixels, based on the synchronizing signal on which the control by the synchronizing signal control section is reflected.

(8) A signal processing method, including:

controlling length of a synchronizing signal for a predetermined row in a frame, the synchronizing signal being a basis of charge read processing that reads charge from a pixel array on a row basis; and adjusting timing of electronic shutter operation of unit pixels, according to the length of the synchronizing signal for the predetermined row.

(9) An image pickup device, including:

a pixel array including unit pixels that are arranged side by side, each of the unit pixels including a photoelectric conversion element configured to perform photoelectric conversion on incident light;

a synchronizing signal control section configured to control length of a synchronizing signal for a predetermined row in a frame, the synchronizing signal being a basis of charge read processing that reads charge from the pixel array on a row basis; and a timing adjustment section configured to adjust timing of electronic shutter operation of the unit pixels, according to the length of the synchronizing signal for the predetermined row controlled by the synchronizing signal control section.

(10) An image pickup apparatus provided with an image pickup section and an image processing section, the image pickup section being configured to capture an image of an object, and the image processing section being configured to perform image processing on image data obtained through the image capture by the image pickup section, the image pickup section including:

a pixel array including unit pixels that are arranged side by side, each of the unit pixels including a photoelectric conversion element configured to perform photoelectric conversion on incident light;

a synchronizing signal control section configured to control length of a synchronizing signal for a predetermined row in a frame, the synchronizing signal being a basis of charge read processing that reads charge from the pixel array on a row basis; and a timing adjustment section configured to adjust timing of electronic shutter operation of the unit pixels, according to the length of the synchronizing signal for the predetermined row controlled by the synchronizing signal control section.

(11) A signal processing unit, including:

a measuring section configured to measure length of a horizontal synchronizing signal using an internal clock, and to generate a parameter that determines, based on the internal clock, processing time for one row, the horizontal synchronizing signal being a basis of charge read processing that reads charge from a pixel array on a row basis and being based on an external clock, and the internal clock being asynchronous to the external clock; and a horizontal-synchronizing-signal generation section configured to generate the horizontal synchronizing signal that is based on the internal clock, using the parameter determined by the measuring section.

(12) The signal processing unit according to any one of (11) and (13) to (17), wherein the measuring section measures the length of the horizontal synchronizing signal that is based on the external clock and for a predetermined row in a blanking period.

(13) The signal processing unit according to any one of (11) and (12) and (14) to (17), wherein the measuring section generates the parameter through measuring the length of the horizontal synchronizing signal that is based on the external clock and for one row in the blanking period.

(14) The signal processing unit according to any one of (11) to (13) and (15) to (17), wherein the measuring section measures the length of the horizontal synchronizing signal that is based on the external clock and for each of a plurality of rows in the blanking period, and generates the parameter from a result of the measurement for each of the rows.

(15) The signal processing unit according to any one of (11) to (14) and (16) and (17), further including an external-clock-based horizontal-synchronizing-signal generation section configured to generate the horizontal synchronizing signal that is based on the external clock, wherein the measuring section measures the length of the horizontal synchronizing signal that is based on the external clock and generated by the external-clock-based horizontal-synchronizing-signal generation section.

(16) The signal processing unit according to any one of (11) to (15) and (17), further including an internal-clock generation section configured to generate the internal clock using the external clock, wherein the measuring section measures the length of the horizontal synchronizing signal that is based on the external clock, using the internal clock generated by the internal-clock generation section, and the horizontal-synchronizing-signal generation section generates the horizontal synchronizing signal that is based on the internal clock, using the parameter determined by the measuring section and the internal clock generated by the internal-clock generation section.

(17) The signal processing unit according to any one of (11) to (16), wherein the internal-clock generation section generates the internal clock using another external clock that is independent of the external clock that serves as a basis of the horizontal synchronizing signal to be measured by the measuring section.

(18) A signal processing method, including:
 measuring length of a horizontal synchronizing signal using an internal clock, thereby generating a parameter that determines, based on the internal clock, processing time for one row, the horizontal synchronizing signal being a basis of charge read processing that reads charge from a pixel array on a row basis and being based on an external clock, and the internal clock being asynchronous to the external clock; and
 generating, using the determined parameter, the horizontal synchronizing signal that is based on the internal clock.

(19) An image pickup device, including:
 a pixel array including unit pixels that are arranged side by side, each of the unit pixels including a photoelectric conversion element configured to perform photoelectric conversion on incident light;
 a measuring section configured to measure length of a horizontal synchronizing signal using an internal clock, and to generate a parameter that determines, based on the internal clock, processing time for one row, the horizontal synchronizing signal being a basis of charge read processing that reads charge from the pixel array on a row basis and being based on an external clock, and the internal clock being asynchronous to the external clock; and
 a horizontal-synchronizing-signal generation section configured to generate the horizontal synchronizing signal that is based on the internal clock, using the parameter determined by the measuring section.

(20) An image pickup apparatus provided with an image pickup section and an image processing section, the image pickup section being configured to capture an image of an object, and the image processing section being configured to perform image processing on image data obtained through the image capture by the image pickup section, the image pickup section including:
 a pixel array including unit pixels that are arranged side by side, each of the unit pixels including a photoelectric conversion element configured to perform photoelectric conversion on incident light;
 a measuring section configured to measure length of a horizontal synchronizing signal using an internal clock, and to generate a parameter that determines, based on the internal clock, processing time for one row, the horizontal synchronizing signal being a basis of charge read processing that reads charge from the pixel array on a row basis and being based on an external clock, and the internal clock being asynchronous to the external clock; and
 a horizontal-synchronizing-signal generation section configured to generate the horizontal synchronizing signal that is based on the internal clock, using the parameter determined by the measuring section.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing unit, comprising:
 a synchronizing signal control section configured to control length of a synchronizing signal for a predetermined row in a frame, the synchronizing signal being a basis of charge read processing that reads charge from a pixel array on a row basis; and
 a timing adjustment section configured to adjust timing of electronic shutter operation of unit pixels, according to the length of the synchronizing signal for the predetermined row controlled by the synchronizing signal control section;
 wherein the length of the synchronizing signal for the predetermined row is controlled by adding to the predetermined row, an adjustment row shorter than other rows in the frame.

2. The signal processing unit according to claim 1, wherein the timing adjustment section is configured to adjust the timing to allow exposure time of each row to be constant.

3. The signal processing unit according to claim 1, wherein the synchronizing signal control section is configured to control the length of the synchronizing signal for the predetermined row within a range that is shorter than length of the synchronizing signal for one row, to allow length of the synchronizing signal for one frame to correspond to a desired frame rate.

4. The signal processing unit according to claim 1, wherein the synchronizing signal control section is configured to set the predetermined row to be within a blanking period.

5. The signal processing unit according to claim 1, further comprising an exposure time determination section configured to determine exposure time of each row on which the control by the synchronizing signal control section is reflected,
 wherein the timing adjustment section is configured to adjust the timing according to the exposure time determined by the exposure time determination section.

6. The signal processing unit according to claim 1, further comprising a synchronizing signal generation section configured to generate the synchronizing signal on which the control by the synchronizing signal control section is reflected,
 wherein the timing adjustment section is configured to adjust the timing, according to the length of the synchronizing signal generated by the synchronizing signal generation section for the predetermined row.

7. The signal processing unit according to claim 1, further comprising:
 a shutter control section configured to control the electronic shutter operation to be performed at timing adjusted by the timing adjustment section, based on the synchronizing signal on which the control by the synchronizing signal control section is reflected; and
 a read control section configured to control the charge read operation of the unit pixels, based on the synchronizing signal on which the control by the synchronizing signal control section is reflected.

8. A signal processing method, comprising:
 controlling length of a synchronizing signal for a predetermined row in a frame, the synchronizing signal being a basis of charge read processing that reads charge from a pixel array on a row basis; and
 adjusting timing of electronic shutter operation of unit pixels, according to the length of the synchronizing signal for the predetermined row,
 wherein the length of the synchronizing signal for the predetermined row is controlled by adding to the predetermined row, an adjustment row shorter than other rows in the frame.

9. An image pickup device, comprising:
 a pixel array including unit pixels that are arranged side by side, each of the unit pixels including a photoelectric conversion element configured to perform photoelectric conversion on incident light;

a synchronizing signal control section configured to control length of a synchronizing signal for a predetermined row in a frame, the synchronizing signal being a basis of charge read processing that reads charge from the pixel array on a row basis; and a timing adjustment section configured to adjust timing of electronic shutter operation of the unit pixels, according to the length of the synchronizing signal for the predetermined row controlled by the synchronizing signal control section, wherein the length of the synchronizing signal for the predetermined row is controlled by adding to the predetermined row, an adjustment row shorter than other rows in the frame.

10. An image pickup apparatus provided with an image pickup section and an image processing section, the image pickup section being configured to capture an image of an object, and the image processing section being configured to perform image processing on image data obtained through the image capture by the image pickup section, the image pickup section comprising:

a pixel array including unit pixels that are arranged side by side, each of the unit pixels including a photoelectric conversion element configured to perform photoelectric conversion on incident light;

a synchronizing signal control section configured to control length of a synchronizing signal for a predetermined row in a frame, the synchronizing signal being a basis of charge read processing that reads charge from the pixel array on a row basis; and a timing adjustment section configured to adjust timing of electronic shutter operation of the unit pixels, according to the length of the synchronizing signal for the predetermined row controlled by the synchronizing signal control section, wherein the length of the synchronizing signal for the predetermined row is controlled by adding to the predetermined row, an adjustment row shorter than other rows in the frame.

11. A signal processing unit, comprising:

a measuring section configured to measure length of a horizontal synchronizing signal using an internal clock, and to generate a parameter that determines, based on the internal clock, processing time for one row, the horizontal synchronizing signal being a basis of charge read processing that reads charge from a pixel array on a row basis and being based on an external clock, and the internal clock being asynchronous to the external clock; and a horizontal-synchronizing-signal generation section configured to generate the horizontal synchronizing signal that is based on the internal clock, using the parameter determined by the measuring section.

12. The signal processing unit according to claim 11, wherein the measuring section is configured to measure the length of the horizontal synchronizing signal that is based on the external clock and for a predetermined row in a blanking period.

13. The signal processing unit according to claim 12, wherein the measuring section is configured to generate the parameter through measuring the length of the horizontal synchronizing signal that is based on the external clock and for one row in the blanking period.

14. The signal processing unit according to claim 12, wherein the measuring section is configured to measure the length of the horizontal synchronizing signal that is based on the external clock and for each of a plurality of rows in the blanking period, and generate the parameter from a result of the measurement for each of the rows.

15. The signal processing unit according to claim 11, further comprising an external-clock-based horizontal-synchronizing-signal generation section configured to generate the horizontal synchronizing signal that is based on the external clock, wherein the measuring section is configured to measure the length of the horizontal synchronizing signal that is based on the external clock and generated by the external-clock-based horizontal-synchronizing-signal generation section.

16. The signal processing unit according to claim 11, further comprising an internal-clock generation section configured to generate the internal clock using the external clock, wherein the measuring section is configured to measure the length of the horizontal synchronizing signal that is based on the external clock, using the internal clock generated by the internal-clock generation section, and the horizontal-synchronizing-signal generation section is configured to generate the horizontal synchronizing signal that is based on the internal clock, using the parameter determined by the measuring section and the internal clock generated by the internal-clock generation section.

17. The signal processing unit according to claim 16, wherein the internal-clock generation section is configured to generate the internal clock using another external clock that is independent of the external clock that serves as a basis of the horizontal synchronizing signal to be measured by the measuring section.

18. A signal processing method, comprising:

measuring length of a horizontal synchronizing signal using an internal clock, thereby generating a parameter that determines, based on the internal clock, processing time for one row, the horizontal synchronizing signal being a basis of charge read processing that reads charge from a pixel array on a row basis and being based on an external clock, and the internal clock being asynchronous to the external clock; and generating, using the determined parameter, the horizontal synchronizing signal that is based on the internal clock.

19. An image pickup device, comprising:

a pixel array including unit pixels that are arranged side by side, each of the unit pixels including a photoelectric conversion element configured to perform photoelectric conversion on incident light;

a measuring section configured to measure length of a horizontal synchronizing signal using an internal clock, and to generate a parameter that determines, based on the internal clock, processing time for one row, the horizontal synchronizing signal being a basis of charge read processing that reads charge from the pixel array on a row basis and being based on an external clock, and the internal clock being asynchronous to the external clock; and a horizontal-synchronizing-signal generation section configured to generate the horizontal synchronizing signal that is based on the internal clock, using the parameter determined by the measuring section.

20. An image pickup apparatus provided with an image pickup section and an image processing section, the image pickup section being configured to capture an image of an object, and the image processing section being configured to perform image processing on image data obtained through the image capture by the image pickup section, the image pickup section comprising:
- a pixel array including unit pixels that are arranged side by side, each of the unit pixels including a photoelectric conversion element configured to perform photoelectric conversion on incident light;
- a measuring section configured to measure length of a horizontal synchronizing signal using an internal clock, and to generate a parameter that determines, based on the internal clock, processing time for one row, the horizontal synchronizing signal being a basis of charge read processing that reads charge from the pixel array on a row basis and being based on an external clock, and the internal clock being asynchronous to the external clock; and
- a horizontal-synchronizing-signal generation section configured to generate the horizontal synchronizing signal that is based on the internal clock, using the parameter determined by the measuring section.

* * * * *